(12) United States Patent
Asai et al.

(10) Patent No.: US 6,234,280 B1
(45) Date of Patent: May 22, 2001

(54) DRUM BRAKE DEVICE

(75) Inventors: Seiji Asai, Okazaki; Yasushi Kobayashi, Nagoya, both of (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/562,278

(22) Filed: May 1, 2000

Related U.S. Application Data

(62) Division of application No. 08/947,327, filed on Oct. 8, 1997, now Pat. No. 6,082,505.

(30) Foreign Application Priority Data

Oct. 8, 1996 (JP) .................................................. 8-286126

(51) Int. Cl.[7] .................................................. F16D 51/00
(52) U.S. Cl. .................................. 188/79.54; 188/196 BA
(58) Field of Search ........................... 188/106 A, 106 F, 188/106 P, 79.54, 79.62, 79.63, 196 P, 196 B, 196 BA

(56) References Cited

U.S. PATENT DOCUMENTS

| | | | |
|---|---|---|---|
| 4,336,867 | * | 6/1982 | Woo .................................. 188/106 A |
| 4,364,456 | * | 12/1982 | Colpaert ........................... 188/106 A |
| 4,375,252 | * | 3/1983 | Aono et al. ....................... 188/106 F |
| 4,387,792 | * | 6/1983 | Imamura ........................... 188/106 A |
| 5,058,713 | * | 10/1991 | Evans ................................ 188/79.54 |
| 5,070,968 | * | 12/1991 | Evans ................................ 188/106 A |
| 5,275,260 | * | 1/1994 | Evans et al. ...................... 188/106 A |
| 5,360,086 | * | 11/1994 | Charmat ............................ 188/79.54 |
| 5,720,367 | * | 2/1998 | Evans ................................ 188/79.64 |
| 6,044,938 | * | 4/2000 | Yabusaki et al. ................. 188/106 A |
| 6,095,296 | * | 8/2000 | Ikeda ............................. 188/196 BA |

\* cited by examiner

*Primary Examiner*—Robert J. Oberleitner
*Assistant Examiner*—Robert A. Siconolfi
(74) *Attorney, Agent, or Firm*—Arent Fox Kintner Plotkin & Kahn

(57) ABSTRACT

A drum device is provided that functions as a very stable leading-trailing (LT) type when the service brake is applied, and as a highly effective duo-servo (DS) type with very little fluctuation in stroke when the parking brake is applied, in which strange noises are not generated, and any impact load is not applied to any of the components, thus enabling a lighter device. A shoe clearance adjustment device (12), adjacent to a service brake actuator (8) is suspended between the two brake shoes (2, 3). A parking brake actuator (18) is adjacent to an anchor (9). The middle segment of a long link (11) is pivotable in the middle of the one brake shoe (2). The ends of the link are functionally engaged with the shoe clearance adjustment device (12) and the parking brake actuator (18), respectively. The parking brake actuator (18) is equipped with a stroke adjustment device.

9 Claims, 18 Drawing Sheets

DRUM BRAKE DEVICE

This application is a divisional application filed under 37 CFR § 1.53(b) of parent application Ser. No. 08/947,327, filed Oct. 8, 1997, now U.S. Pat. No. 6,082,505.

BACKGROUND OF THE INVENTION

This invention relates to a drum brake device. More specifically, it relates to a drum brake device that functions as a leading-trailing (LT) type when the service brake is applied, and as a duo-servo (DS) type when the parking brake is applied.

This type of drum brake device has been disclosed in Australian Patent No. AU-B1-53 491179 and U.S. Pat. No. 5,275,260. The basic brake functions are the same in both devices, and the structure will be explained with reference to FIG. 17. A pair of brake shoes b, c are provided on top of a back plate a. An anchor block d is provided between the adjacent ends of one side of each brake shoe, and a hydraulic cylinder g is provided between the other adjacent ends of each brake shoe. A parking lever j is pivoted on one end i of one brake shoe b. An idler lever k is pivoted so as to swing on the other brake shoe c. The first and second rods l, m are provided between the two brake shoes b, c, wherein one end n of the first rod l engages the parking lever j, and the other end o engages with the idler lever k; and one end p of the second rod m engages one brake shoe b, while the other end q engages with the other brake shoe c and the idler lever k.

The brake action is explained as follows. When the driver steps on the brake pedal, the hydraulic cylinder g is pressurized, wherein the two brake shoes b, c spread open, with the point of abutment with the anchor block d as the fulcrum, to cause a frictional connection with the rotating brake drum, not shown in the diagram, in a leading-trailing braking action.

When the parking brake is applied, the parking lever j is pulled in the direction of the arrow X. The force of that action is transferred in sequence to the first rod l, idler lever k, and second rod m, wherein the one brake shoe b opens with its point of abutment with the anchor block d as the fulcrum, and to cause a frictional connection with the brake drum. Next, the idler lever k spreads open, with the point of abutment with the second rod as the fulcrum, causing the pivot component of the idler lever k to press the other brake shoe c in the direction of the arrow Y to cause a frictional connection with the brake drum. At the same time, the reaction force of the parking lever j is being applied in the direction of the arrow Z on the one end i of the one brake shoe b.

If at this time, the torque is applied on the brake drum in the direction of arrow R (uphill or downhill), the friction force of the one brake shoe b is transferred to the second rod m, wherein its other end q presses against the other brake shoe c, supported by the anchor block d, in a duo-servo braking action. If the torque is applied on the brake drum in the opposite direction of arrow R, the friction force of the other brake shoe c is transferred to the second rod m, whereby its one end p is pressed against the one brake shoe b, supported by the anchor block d, in the same duo-servo braking action as above.

As is evident from this parking brake operation, if the other end q of the second rod m abuts the idler lever k and a gap exists between the other end q and the other brake shoe c, then whether the shoe c rotates in the opposite direction of R, the piston of the hydraulic cylinder g is repelled to an amount equivalent to the gap. That is, the brake pedal is repelled which is not only disconcerting to the driver, but the pedal stroke increases in the next brake pedal application. Conversely, if the other end q of the second rod m abuts against the other brake shoe c and a gap exists between the other end q and the idler lever k, then the stroke of the parking lever j increases by an amount equivalent to this gap; that is, the stroke of the hand lever increases. From these perspectives, it is preferable that the gap between the other end q of the second rod m and either the other brake shoe c or the idler lever k be as small as possible.

Next, FIG. 18 illustrates the concept of the automatic shoe clearance device which is installed in the drum brake device of U.S. Pat. No. 5,275,260. The bent end y of the adjustment lever r is pivotable on the web of brake shoe c, and one upper arm s is connected to the groove of the upper strut t for their interaction. Another arm is connected to the star wheel u of the upper strut t. A spring w, stretched between the adjustment lever r and the pivot lever v, energizes the adjustment lever r in the counterclockwise direction, with the end y as the fulcrum.

Should the brake lining be worn causing the two brake shoes b, c to open by more than a prescribed value when the service brake is applied, the upper arm causes the star wheel u to rotate to automatically extend the entire length of the upper strut t, thereby maintaining a constant clearance between the brake shoes b, c and the brake drum z.

The drum brake device as described above has need of improvement in the following areas:

The cumulative effect of the tolerances of each component of the parking brake system will inevitably create a gap between the idler lever k and the first rod l or the second rod m, and the brake stroke becomes ineffective by an amount equivalent to this gap.

Moreover, as the lining of the other brake shoe c gradually wears, there is a gradual shift in the point at which the second rod m contacts with the brake shoe c or the idler lever k. That is, as shown in FIG. 17, the amount of displacement δ of the brake shoe c at the brake center, and the amount of displacement δc and δk of the brake shoe c and idler lever k respectively at the point of contact with the second rod m are defined as follows:

$$\text{Brake shoe displacement } \delta c = \frac{H1 + H2}{H1} \times \delta \qquad \text{Formula (1)}$$

$$\text{Idler lever } k \text{ displacement } \delta k = \frac{H2 + H3}{H3} \times \delta, \qquad \text{Formula (2)}$$

where

H1: Distance from anchor d to the brake center (pivot point of brake shoe c and idler lever k);

H2: Distance from the brake center to the second rod m;

H3: Distance from the brake center to the first rod l;

δ: Amount of lining wear.

In this case, H3 is considerably smaller than H1, hence the displacement δk of the idler lever k will be considerably larger than the displacement δc of the brake shoe c. As a result, the stroke of the parking lever j will increase as the lining wears. The driver not only feels a greater slackness in the hand brake, but there are concerns as well that the lever j could interfere with other components to lessen the effectiveness of the braking action. In addition, the stroke of the parking lever could also limit the brake size, brake offset, and other brake factors to constrain the degree of freedom in the brake design.

If H3 (distance from the center of rotation of the idler lever k to the first rod l) and H2 (distance from the same point to the second rod m) are set to be equal, and the brake drum rotates in the direction of the arrow R when the parking brake is applied, then the one brake shoe b, the parking lever j and other components will turn in tandem in the same direction (the degree of rotation will be equivalent to the distance traveled by the other end q of the second rod until it starts to press against the other brake shoe c). FIG. 19 is a conceptual drawing of this operation. The double-dash broken line shows the state of the device if the parking brake is activated after the vehicle is stopped by the service brake on a slope. The one ends i of both brake shoes b, c are supported by the anchor block d. Then if the service brake is released in this state, the force of gravity acting on the vehicle causes the brake drum, not shown in the diagram, to rotate in the direction of the arrow R, whereby the one brake shoe b and the parking lever j are shifted to the positions indicated by the solid line and broken line respectively. As a result, if point s is the outlet of the parking brake pulling mechanism, then the distance from point s to the pulled part of the parking lever j is shortened by an amount equal to $(l_1-l_2)$. In other words, the pulled part of the parking lever j is shifted in the direction of the pull to loosen the locked parking brake pulling mechanism, thus reducing the effectiveness of the parking brake.

When the parking brake is applied, the adjacent ends of each side of the both brake shoes move apart to spread apart the whole brake assembly. In other words, the one end of both of the shoes also separate at once from the anchor block. When the brake drum which is interlocked with the wheels starts to rotate with the device in this state, both brake shoes, the rods, and other components all turn in tandem, wherein one or the other brake shoe collides against the anchor block. The noise so generated is not only disconcerting to the driver. Additionally, since this impact load is applied repeatedly on the anchor block, the strength of the components becomes critical.

In the conventional device as disclosed in Australian Patent No. AU-B1-53 491179, the cumulative effect of the tolerances of each component will be such that the idler lever could abut against the second rod or play could be generated. At the very least, play will be generated when the driver steps on the brake pedal. Accordingly, the idler lever could vibrate creating a strange noise when the vehicle is in motion or the service brake is applied. Again this noise can be disconcerting to the driver.

In the conventional device as disclosed in U.S. Pat. No. 5,275,260 as the lining wears, the adjustment lever becomes interlocked with the brake shoe and moves with its point of abutment with the support block as the fulcrum, while the pivot lever moves with its point of abutment with the lower strut as the fulcrum. This changes the energizing force of the adjustment spring energizing the adjustment lever, which has a negative effect on the automatic adjustment process when only a very minimal adjustment is required.

OBJECTS AND SUMMARY OF THE INVENTION

This invention was devised to resolve the aforementioned problems by providing a drum brake device that functions as a very stable leading-trailing (LT) type when the service brake is applied, and as a highly effective duo-servo (DS) type when the parking brake is applied.

To that end, it is a first object of the invention to provide to provide a drum brake device in which the automatic shoe clearance adjustment functions very precisely for a prolonged period of time.

The second object is to provide a drum brake device in which strange noises are not generated.

The third object is to provide a drum brake device in which no impact load is applied to any of the components, thus enabling a lighter device.

The fourth object is to provide a drum brake device in which avoids the wheel being locked because of the brake shoe biting the brake drum or unusual dragging occurring between the brake lining and the brake drum.

These and other objects are obtained in a drum brake device comprising certain particular structure.

Claim 1 is a drum brake device comprising: a back plate, two brake shoes provided to face each other on top of said back plate, a service brake actuator on said back plate between one pair of first adjacent ends of said brake shoes, an anchor block on said back plate between the other pair of second adjacent ends of the brake shoes, a shoe clearance adjustment device adjacent to said service brake actuator provided between said brake shoes, a parking brake actuator adjacent to said anchor, a long link having a middle segment pivotably mounted at a pivot point on the middle of one brake shoe, and one end of said link and the other end of said link respectively functionally engaged to said shoe clearance adjustment device and said parking brake actuator; wherein a stroke adjustment device fitted to said parking brake actuator to adjust the stroke of said parking brake actuator in the direction of the stroke of said parking brake actuator.

Claim 2 is a drum brake device as claimed in claim 1, wherein said long link operates in tandem with said one brake shoe when the service brake is applied.

Claim 3 is a drum brake device as claimed in claim 1, in which said shoe clearance adjustment device senses an amount by which said pair of brake shoes has opened and automatically adjusts the clearance between the brake shoes and the brake drum.

Claim 4 is a drum brake device as claimed in claim 1, in which said stroke adjustment device senses the amount by which said pair of brake shoes has opened and automatically adjusts the stroke of said parking brake actuator.

Claim 5 is a drum brake device as claimed in claim 1, wherein with the pivot point in the central region of said long link as the fulcrum, the resistance to spread open said pair of the brake shoes on said other side is greater than the resistance to spread open said pair of the brake shoes on said one side.

Claim 6 is a drum brake device as claimed in claim 5, wherein the moment applied to the second adjacent ends of the brake shoes, which is a combination of the force of the second shoe return spring and the distance for said pivotal mount of said brake shoe with said link to said shoe return spring, is greater than the moment applied to the first adjacent ends of the brake shoes, which is a combination of the force of the first shoe return spring and the distance from said pivotal mount to said shoe return spring.

Claim 7 is a drum brake device as claimed in claim 1, wherein a protuberance is integrally press-formed on the long link or the central region of one brake shoe at said pivot point and is pivotally engaged in a hole respectively bored at said pivot point in said brake shoe or said link.

Claim 8 is a drum brake device comprising: a back plate, two brake shoes provided to face each other on top of said back plate, a service brake actuator on said back plate between one pair of first adjacent ends of said brake shoes, an anchor block on said back plate between the other pair of second adjacent ends of the brake shoes, a shoe clearance adjustment device adjacent to said service brake actuator between said two brake shoes, a parking brake actuator adjacent to said anchor, a long link having a middle segment pivotably mounted at a pivot point on the middle of one brake shoe, one end of said link and the other end of said link respectively functionally engaged to said shoe clearance adjustment device and said parking brake actuator, wherein a distance from the pivot point in the central region of the long link to the parking brake actuator is longer than a distance from said pivot point to the shoe clearance adjustment device.

Claim 9 is a drum brake device as claimed in claim 8, wherein the long link operates in tandem with said one brake shoe when the service brake is applied.

Claim 10 is a drum brake device as claimed in claim 8, in which said shoe clearance adjustment device senses an amount by which said pair of brake shoes has opened and automatically adjusts the clearance between the brake shoes and the brake drum.

Claim 11 is a drum brake device as claimed in claim 8, in which said stroke adjustment device senses the amount by which said pair of brake shoes has opened and automatically adjusts the stroke of said parking brake actuator.

Claim 12 is a drum brake device as claimed in claim 8, wherein with the pivot point in the central region of said long link as the fulcrum, the resistance to spread open said pair of the brake shoes on said other side is greater than the resistance to spread open said pair of the brake shoes on said one side.

Claim 13 is a drum brake device as claimed in claim 12, wherein the moment applied to the second adjacent ends of the brake shoes, which is a combination of the force of the second shoe return spring and the distance for said pivotal mount of said brake shoe with said link to said shoe return spring, is greater than the moment applied to the first adjacent ends of the brake shoes, which is a combination of the force of the first shoe return spring and the distance from said pivotal mount to said shoe return spring.

Claim 14 is a drum brake device as claimed in claim 8, wherein a protuberance is integrally press-formed on the long link or the central region of one brake shoe at said pivot point and is pivotally engaged in a hole respectively bored at said pivot point in said brake shoe or said link.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Example 1

Figure 1:
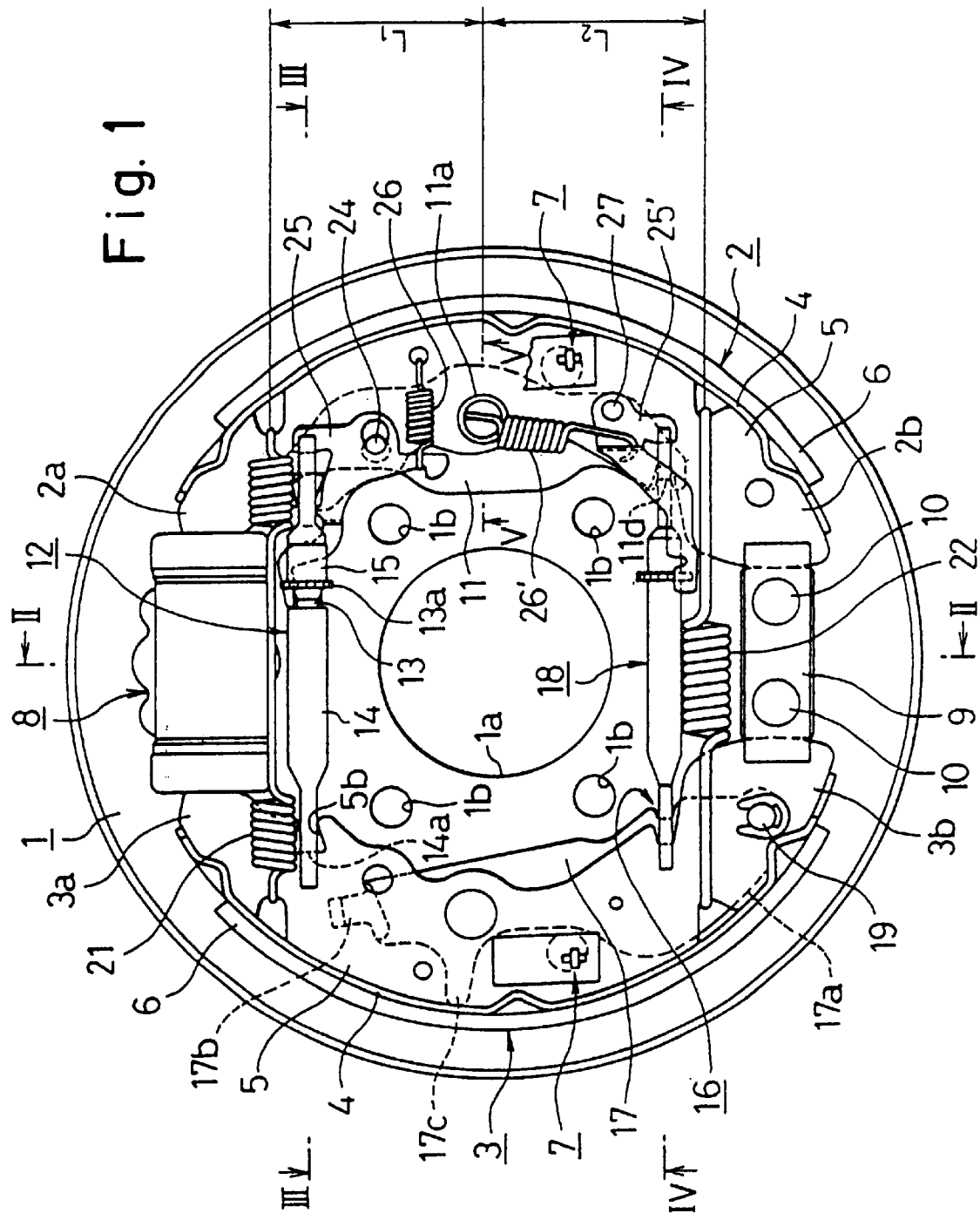
FIG. 1 is a plan view of the drum brake device of this invention as embodied in Example 1, Example 3, and Example 5.
Figure 2:
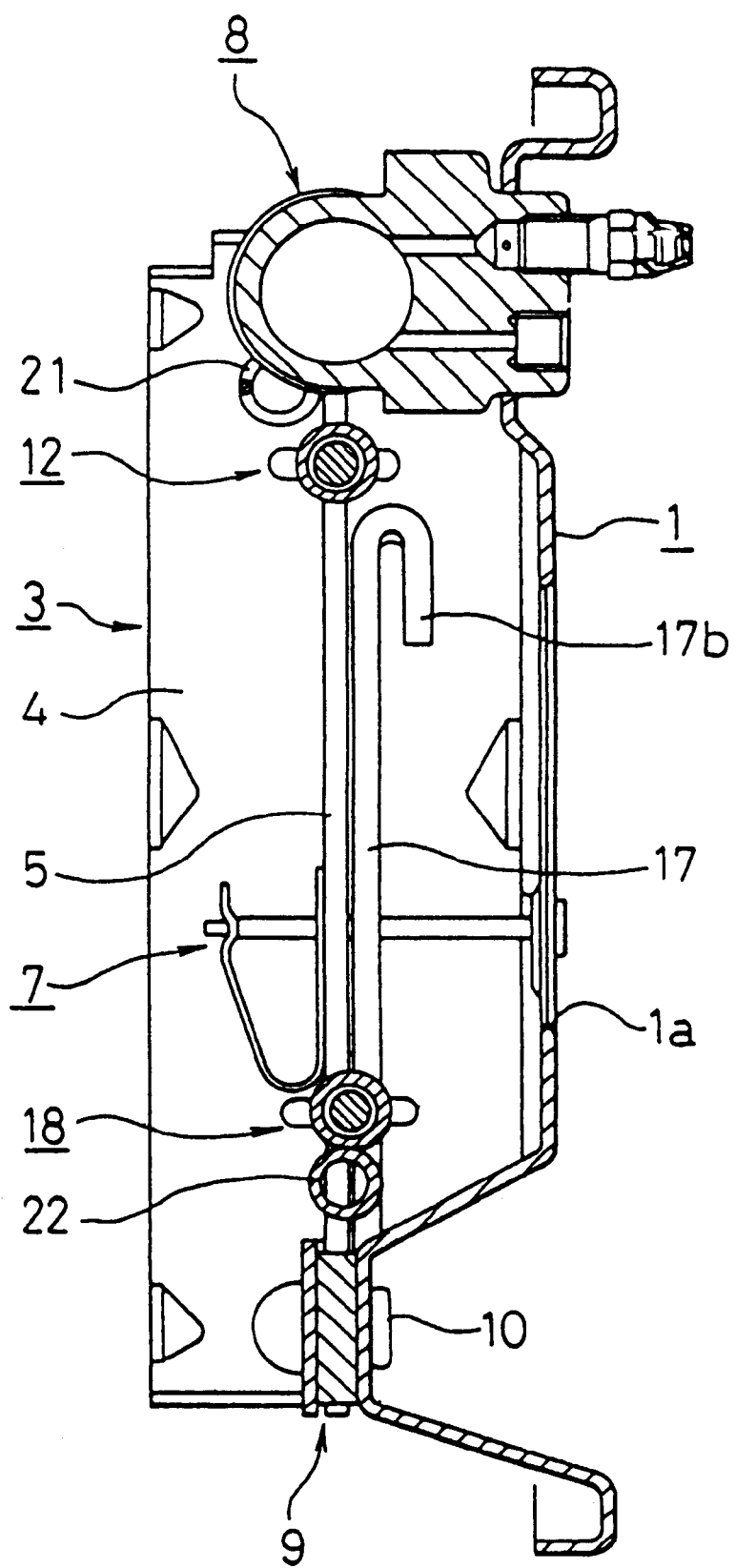
FIG. 2 is a cross section view of FIG. 1 taken along line II—II.

Example 1 is generally shown in FIGS. 1–7. FIG. 1 being a plan view of the drum brake device. The central hole 1a of the back plate 1 is freely inlaid on the vehicle axle and the back plate is affixed to a stationary part of the vehicle by four bolts inserted through the bolt holes 1b. A pair of brake shoes 2, 3, are provided to face oppositely to each other. Each shoe comprises a shoe rim 4, a shoe web 5 joined to the rim 4 to form a "T" in cross section, and a lining 6 affixed around the perimeter of the shoe rim 4. Friction created as the linings are forced against the brake drum (not shown in the drawing) produces the braking action. The brake shoes 2, 3 are each mounted on top of the back plate 1 by a shoe-hold mechanism 7, 7, each comprising a known type of plate spring and pin.

A service brake actuator 8, activated when the service brakes are applied, is provided between one pair of adjacent ends 2a, 3a of the pair of oppositely-facing brake shoes 2, 3, and is affixed to the back plate 1 with bolts or other hardware. A hydraulic wheel cylinder is widely used as the actuator, but an air wheel cylinder can be used.

An anchor block 9 is provided between the other pair of adjacent ends 2b, 3b of the two brake shoes 2, 3. The anchor block 9 is normally affixed on top of a raised segment of the back plate 1 by two rivets 10, 10, but it can be welded if desired. Moreover, an anchor pin can be used in place of the rectangular plate. In either case, the anchor must support each of the other adjacent ends 2b, 3b of the brake shoes 2,3.

Figure 5:
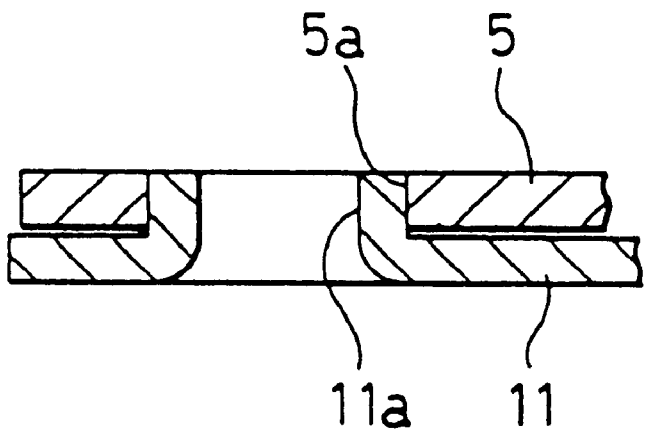
FIG. 5 is a cross section view of FIG. 1 taken along line V—V.
Figure 6:
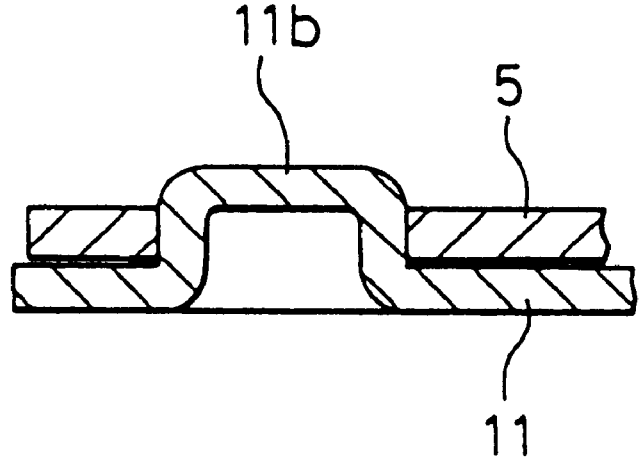
FIG. 6 illustrates a modified example of FIG. 5.
Figure 7:
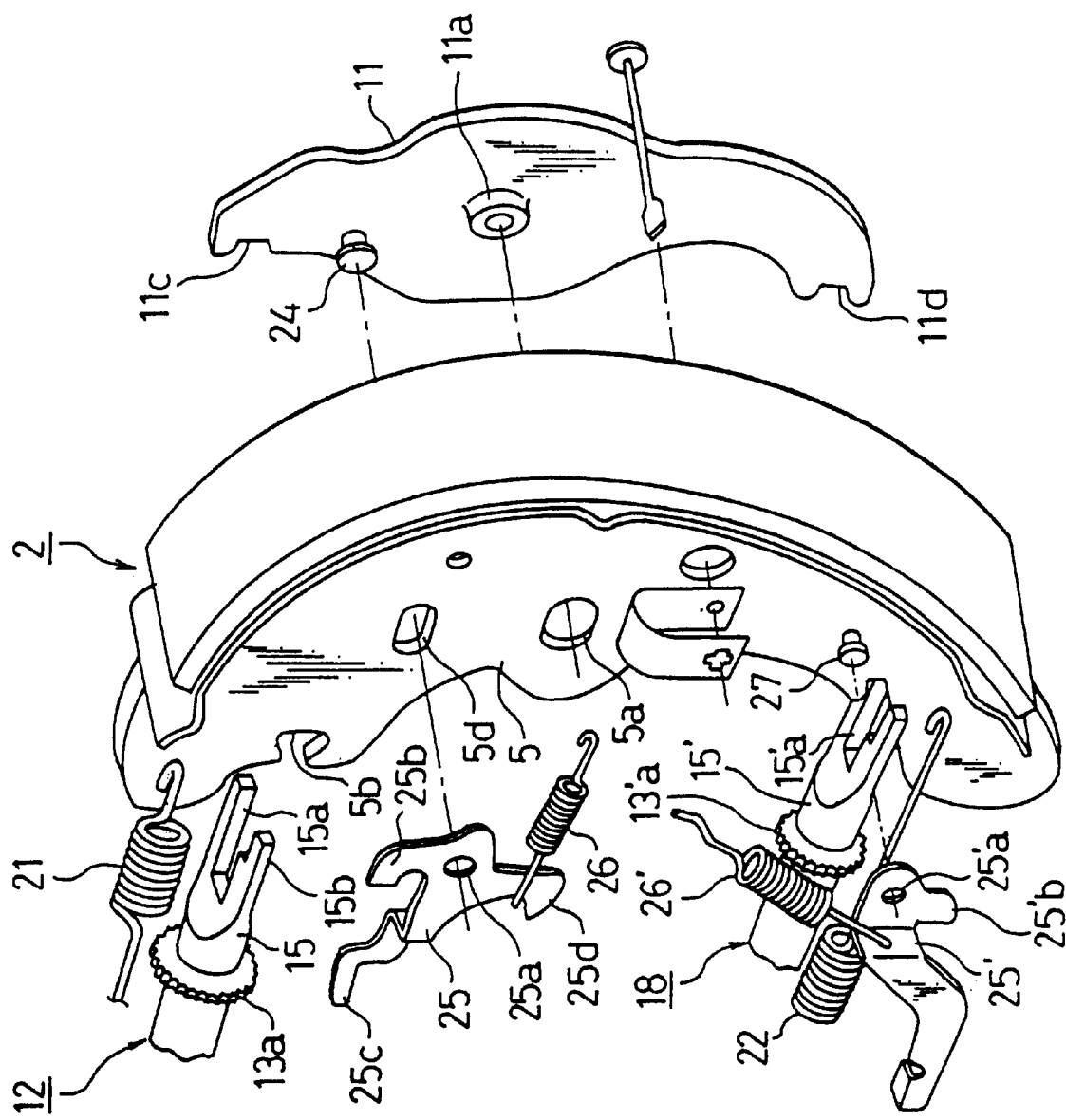
FIG. 7 is a disassembled view of one brake shore, the long link, and related components.

A long link 11 is set under the shoe web 5 of one brake shoe 2. A protuberance 11a, formed as burrs with a press is formed in the center of the link 11, slips into the hole 5a bored in the shoe web 5. As shown in FIG. 7, notched grooves 11c, 11d are formed in the upper and lower segments, respectively. FIG. 5 illustrates the shape of the protuberance 11a; however it can also be formed as drawing with a press to be an inverse U-shaped protuberance 11b as shown in FIG. 6. Either of the protuberances 11a or 11b is integrally formed by a press with the long link 11, but, a protuberance is integrally formed by a press with the shoe web 5, slips into the hole bored in the link 11, or a separate pin can be easily used to support the long link 11 so as to be pivotable on the shoe web.

Figure 3:
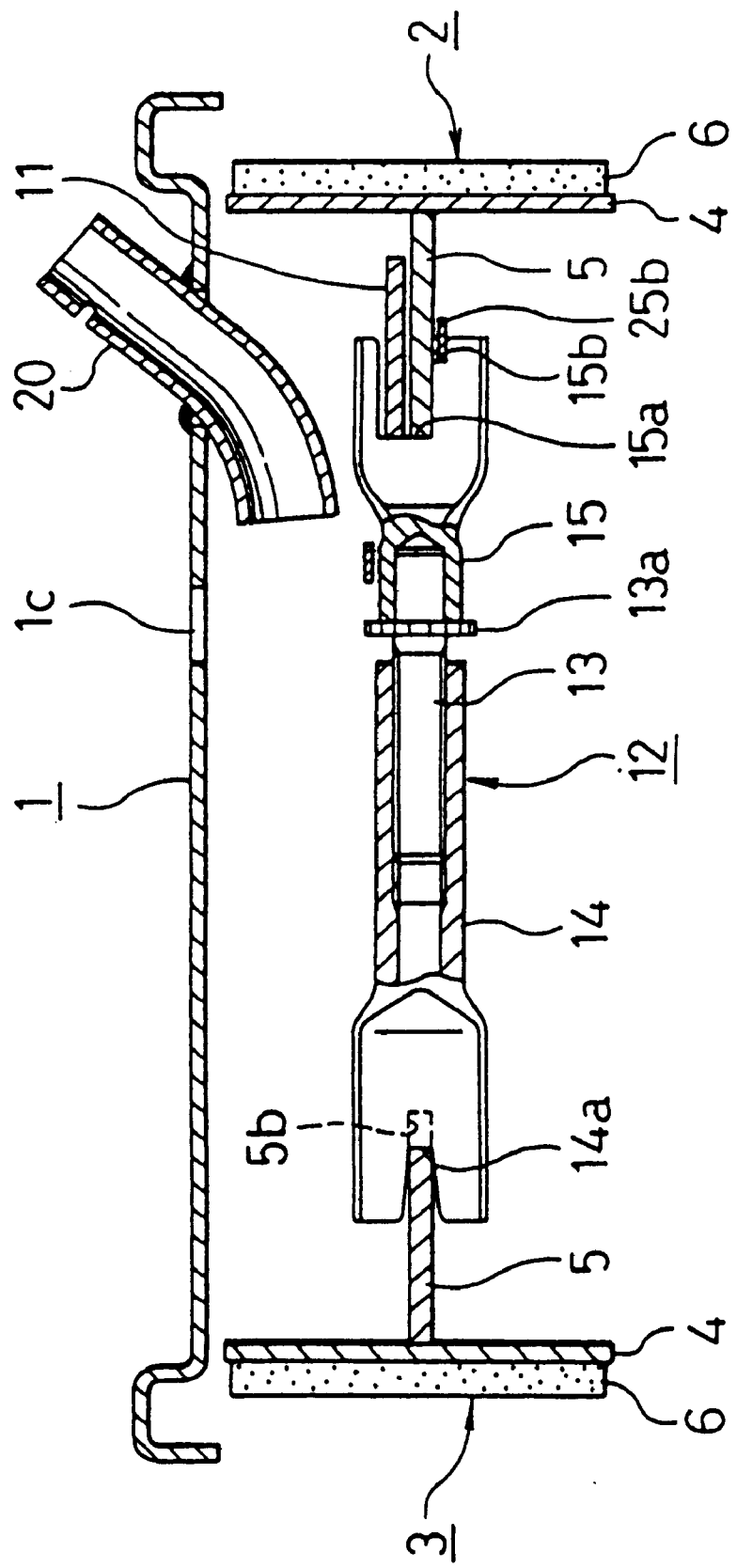
FIG. 3 is a cross section view of FIG. 1 taken along line III—III.

A shoe clearance adjustment device 12, of a known screw type shown in FIG. 3, adjusts the clearance between the brake drum, and the brake shoes 2, 3. These Figures illustrate an automatic shoe clearance adjustment device, to be described later. However, a screw driver can be inserted into the hole 1c, bored in the back plate 1 or the hole bored in the brake drum (not shown), to turn the toothed adjustment wheel 13a which is integrally formed onto the bolt 13. Screwing the toothed adjustment wheel 13a into or out of the threaded tube segment 14 will manually adjust the entire length of the shoe clearance adjustment device 12. A socket 15 supports one end of the bolt 13. A thin plate tip is formed on the end of the tube segment 14 and the end of the socket 15. The socket 15 and the tube segment 14 engage the brake shoes 2, 3 respectively, with a notched groove 14a, 15a formed in each plate tip respectively. The bottom of the notched groove 14a abuts against the bottom of the notched groove 5b formed on the shoe web 5 of the other brake shoe 3; while the bottom of the notched groove 15a abuts against the bottom of the notched groove 5b formed with the shoe web 5 of one brake shoe 2 and the bottom of the notched groove 11c on the one end of the long link 11 as shown in FIG. 3. In reality, however, because of the tolerances in the fabrication of the brake shoe 2, the long link 11, and the other components, there will be a minimal gap equivalent to the tolerances at the bottom of the notched groove 11c or 11d of the long link 11.

The parking brake actuator 16 is activated when the parking brake is applied and comprises a forward-pull brake lever 17, a strut 18, and other components. The brake lever 17 is set under the shoe web 5 of the other brake shoe 3. The base end 17a is pivotable on a pin 19 on the other end 3b of brake shoe 3. A U-shaped groove, onto which is latched the remote control cable (not shown in the drawing) is formed on the free end 17b. A stopper 17c abutting against the inner face of the shoe rim 4 regulates the return position of the brake lever 17 when the parking brake is not activated.

The strut 18 is a clearance adjustment device to adjust the clearance between the long link 11 and the brake lever 17. Its structure and functions are the same as the shoe clearance adjustment device 12, and its structural components are denoted here with an added apostrophe. These drawings illustrate an automatic stroke adjustment device, to be described later. However, a screw driver can be inserted into the hole 1'c, bored in the back plate 1 or brake drum, to turn the toothed adjustment wheel 13'a which is integrally formed onto the bolt 13'. Screwing the toothed adjustment wheel 13'a into or out of the tube segment 14' will manually adjust the whole length of the stroke adjustment device.

Figure 4:
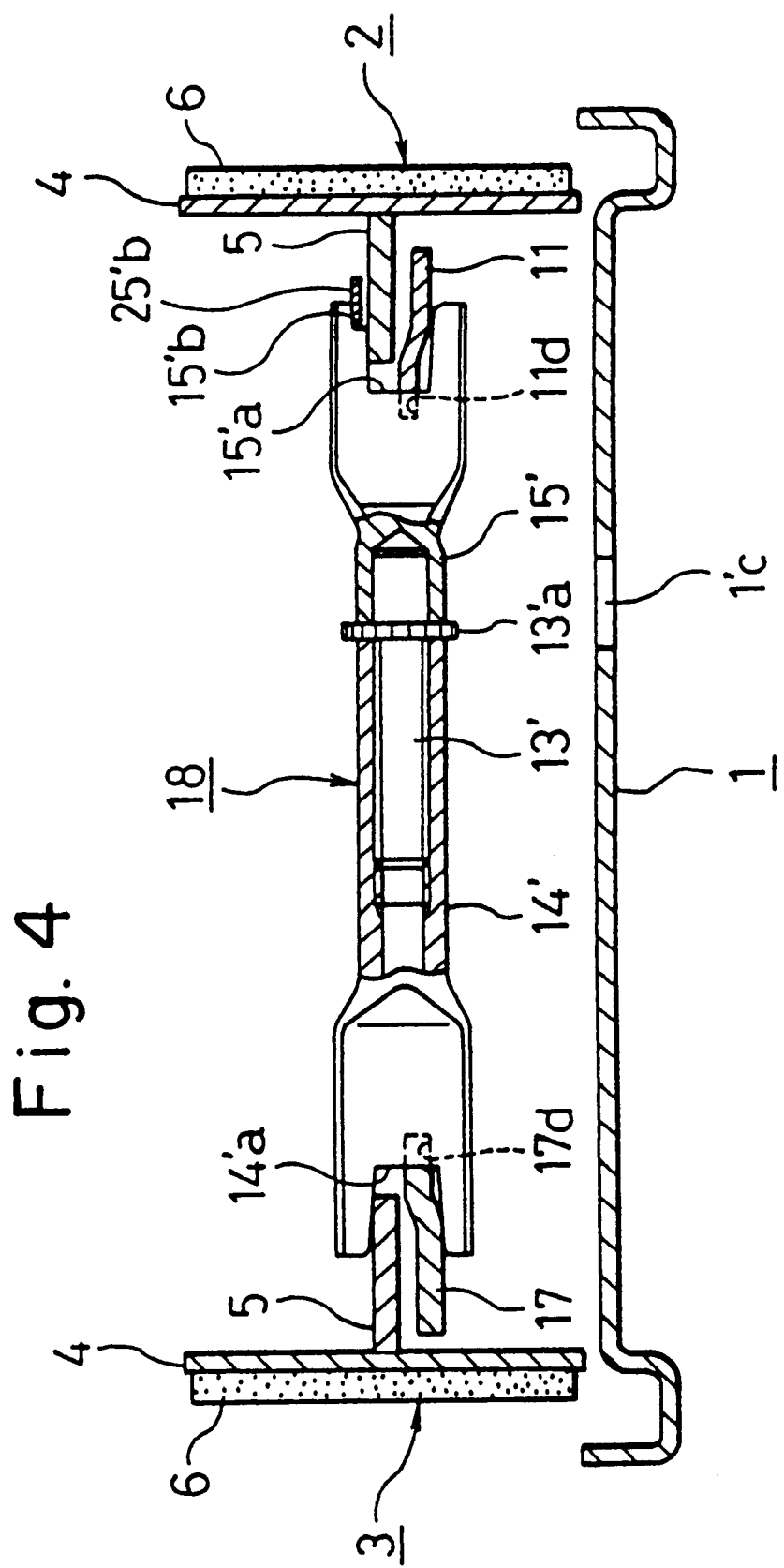
FIG. 4 is a cross section view of FIG. 1 taken along line IV—IV.

As shown in FIG. 4, a thin plate tip is formed on the ends of the tube segment 14' and socket 15'. Notched grooves 14'a and 15'a, formed in each plate tip respectively, are engaged with the notched groove 17d of the brake lever 17 and the notched groove 11d of the long link 11 respectively. The strut 18 can be adjusted to have no slack in the axial direction by the aforementioned manual adjustment.

As shown in FIG. 3, a pipe 20 can serve as the outer casing of the remote control cable (not shown in the drawing). The outer casing of the cable is affixed to the back plate 1. As shown in FIG. 1, an upper or first shoe return spring 21, adjacent to actuator 8 activated when the service brake is applied, is stretched between the one pair of adjacent ends 2a, 3a of the two brake shoes 2, 3. A lower or second shoe return spring 22, positioned adjacent to the anchor block 9, is stretched between the other pair of adjacent ends 2b, 3b of the two brake shoes 2, 3. The mounted loads of the return springs are determined such that the ends of the brake shoes 2,3 on the anchor block 9 side do not spread apart. That is, the first and second shoe return springs 21, 22 are selected so as to satisfy the following relational formula for the respective moment acting on the brake shoes 2, 3:

F1×L1<F2×L2, wherein:
F1: Mounted load of first return spring 21;
F2: Mounted load of second return spring 22;
L1: Distance from the pivot point of brake shoe 2 with link 11 to the first return spring 21;
L2: Distance from the pivot point of brake shoe 2 with link 11 to the second return spring 22.

When the driver steps on the brake pedal, the service brake actuator 8 is pressurized and extends. The one ends 2a, 3a of both brake shoes 2, 3 spread open, with the point of abutment of the other ends 2b, 3b with the anchor block 9 as the fulcrum. This forces the linings 6, 6 against the rotating brake drum, and the friction so created will brake the vehicle. At this point, either brake shoe 2 or brake shoe 3 has a self-servo function while the other does not, hence the drum brake device functions as a leading-trailing type.

The operation of the parking brake is explained next, with each component turning in the direction as shown in FIG. 1.

For example, when the hand brake lever is pulled, the free end 17b of the brake lever 17 is pulled to the right by the remote control cable (not shown in drawing). At this point, the brake lever 17 turns clockwise, with the pin 19 on which the free end 17a pivots as the fulcrum, and presses against the strut 18 with lever-ratio. As the strut 18 presses against the notched groove 11d of the other end of the long link 11, the link 11 turns counterclockwise, with the protuberance 11a as the fulcrum. The force of the rotation is transferred to the notched groove 5b of the other brake shoe 3 via the shoe clearance adjustment device 12, wherein the one end 3a of the brake shoe 3 spreads open, with the other end 3b as the fulcrum and is pressed against the brake drum.

Moreover as the brake lever 17 is pulled, a force is generated to turn the long link 11 counterclockwise, with the one notched groove 11c abutting the shoe clearance adjustment device 12 as the fulcrum, and the action force is transferred to the hole 5a of the one brake shoe 2 by the protuberance 11a. At this point, the torque from the mounted load of the second return spring 22 is large, whereby the brake shoe 2 also opens with its other end 2b as the fulcrum, and is pressed against the brake drum.

If at this point, a clockwise torque is applied on the brake drum, then the friction force of the other brake shoe 3 is transferred to the one brake shoe 2 via the shoe clearance adjustment device 12, wherein the other end 2b of the brake shoe 2 is supported by the anchor block 9 to generate a braking force. Hence the drum brake device functions as a duo-servo type in which both brake shoes 2, 3 have a self-servo function.

If a counterclockwise torque is applied on the brake drum, then the friction force of the one brake shoe 2 is transferred to the other brake shoe 3 via the shoe clearance adjustment device 12, wherein the other end 3b of the brake shoe 3 is supported by the anchor block 9 to generate a braking force. Again the drum brake device functions as a duo-servo type in which both brake shoes 2, 3 have a self-servo function.

With this configuration, as described previously, the amount of displacement of the notched groove of one brake shoe 2 differs from the amount of the displacement of the notched groove 11c of the long link 11 changes as the linings 6, 6 wear. However, the whole length of the strut 18 can be adjusted to be extended by a suitable amount, thereby minimizing the stroke of the brake lever 17 and the return stroke of the piston of the service brake actuator 8. This will preclude a sense of slackness in the hand brake, as well as any concern about interference from other components.

As is evident from this explanation, the brake shoes 2, 3 do not separate from the anchor block 9 until the brake drum rotates when either the service brake or the parking brake is applied. The effect is obviously the same when both brakes are applied together. Accordingly, the other adjacent end 2b or 3b of the brake shoe 2 or 3 respectively does not collide with the anchor block 9 to generate any noise, nor is an impact load applied to the anchor block. That is, the effect differs from a conventional device, in which when the parking brake is applied, the brake shoes 2,3 will open completely wherein the other adjacent ends 2b, 3b will separate from the anchor block 9, thus generating a noise when the brake drum starts to rotate and applying an impact load to the anchor block.

In addition, the adjacent ends 2b, 3b will not be separated from the anchor block 9 even in the situation that the brake lever 17 is not set its return position precisely, thereby maintaining the stability of the brake shoes 2, 3 while driving.

Example 2

Figure 8:
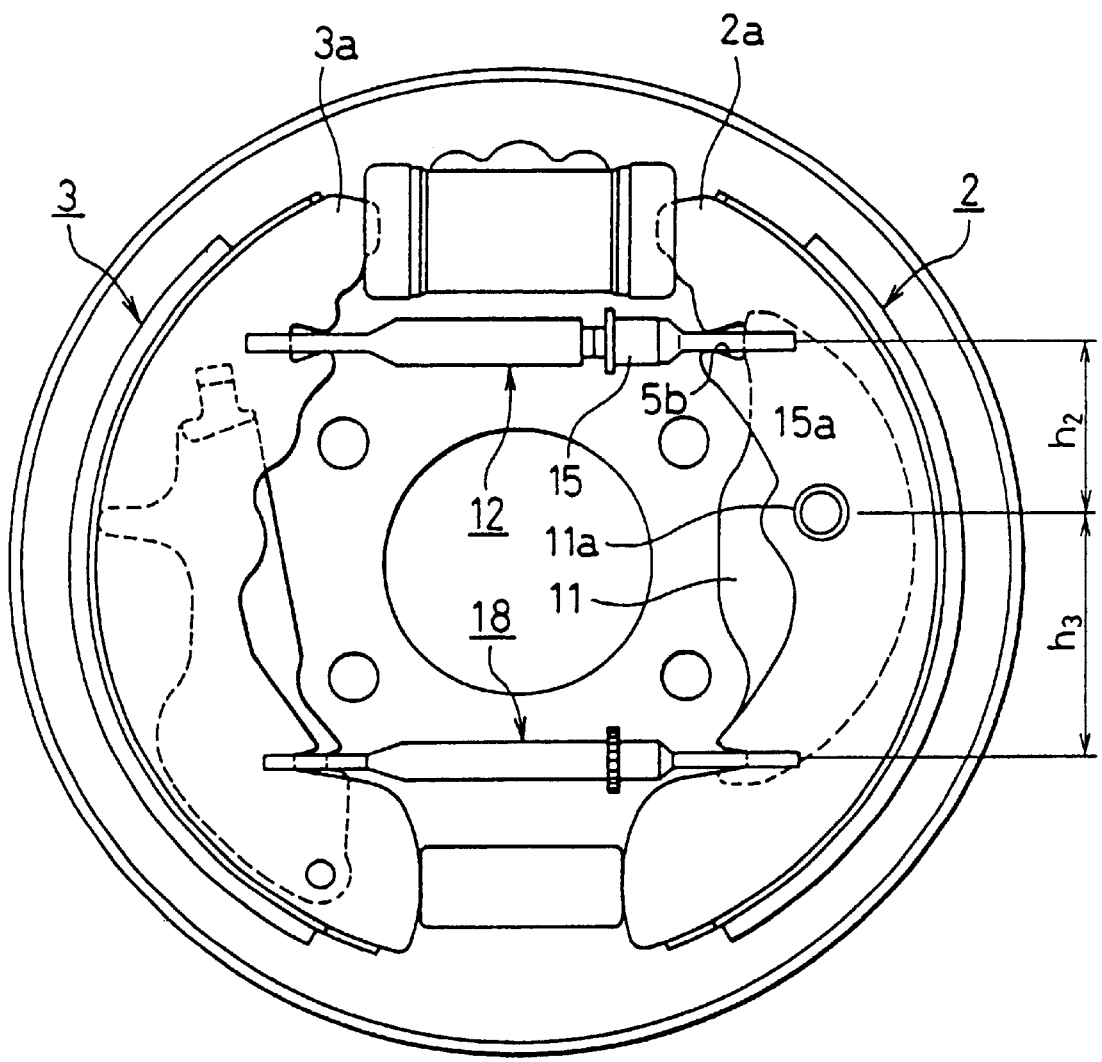
FIG. 8 is a plan view of the drum brake device of this invention as embodied in Example 2.

FIG. 8 illustrates another embodiment of this invention, in which the pivot position of the long link 11 has been changed. Otherwise, all other components are the virtually the same as in Example 1, and are identified with same symbols wherein an explanation is omitted here.

That is, the link 11 has been designed such that h3>h2, wherein:

h2: Distance from the center of the protuberance 11a of long link 11 to the engaging point with the shoe clearance adjustment device 12;

h3: Distance from the center of the protuberance 11a of long link 11 to the engaging point with the strut 18.

If the brakes are applied on a slope, in most cases, the vehicle is stopped with the service brake, the parking brake is applied and the passenger compartment hand lever, not shown in the drawing, is locked, then the service brake is released. During this operation, the one end 3a, 2a of the brake shoes 3, 2 spread to the left and right, and with its protuberance 11a as the fulcrum, the long link 11 rotates counterclockwise, whereby a gap is opened between the bottom of the notched groove 5b on the one brake shoe 2 and the bottom of the notched groove 15a of the socket 15 in an amount equivalent to the rotation of the long link 11.

Figure 9:
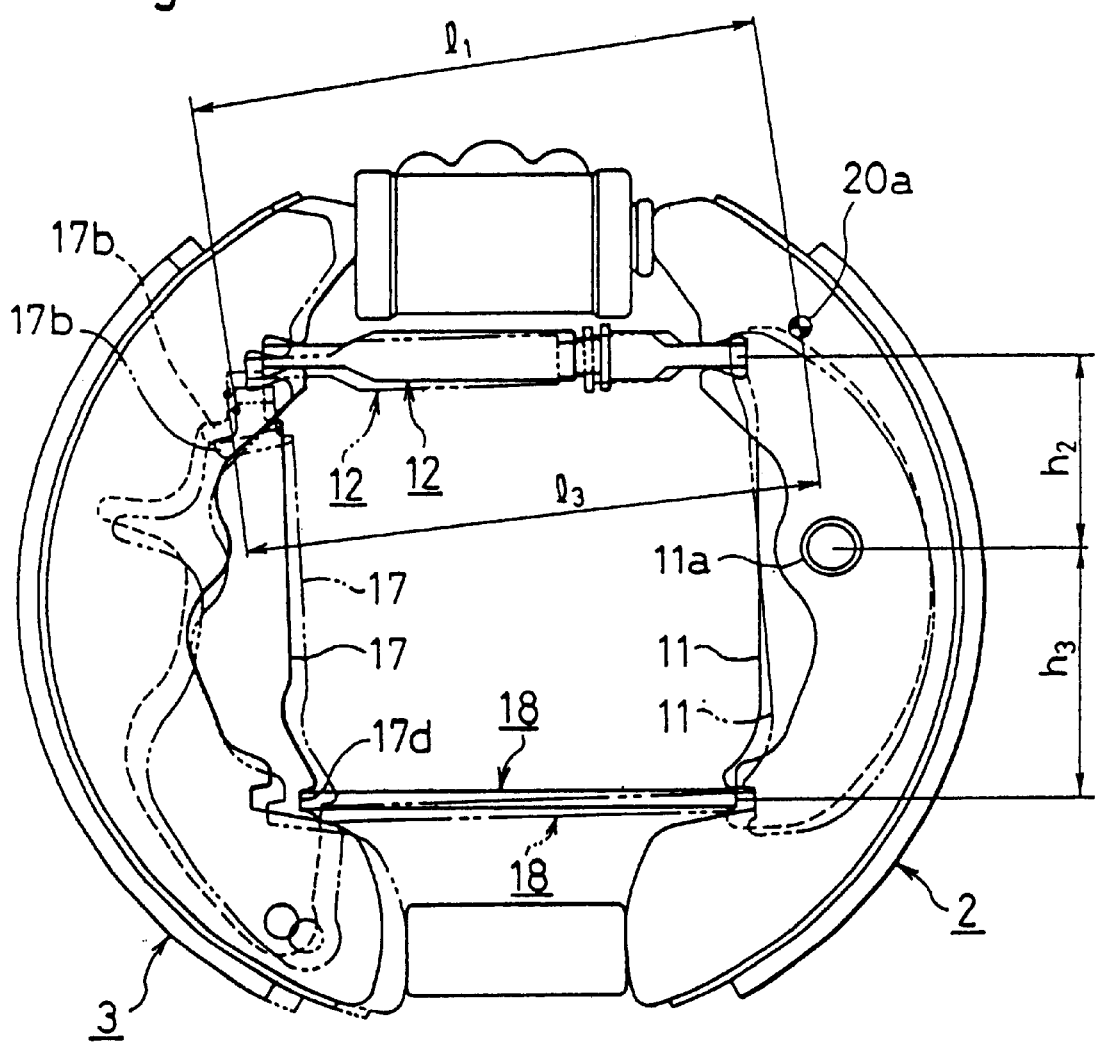
FIG. 9 is a model diagram that explains the operation of the drum brake device of this invention as embodied in Example 2.

If, in this state, a braking force acts to rotate the brake drum clockwise (uphill or downhill), then the other brake shoe 3, brake lever 17, and other components rotate in tandem in an amount just to close the gap. In other words, the bottom of the notched groove 15a of the socket 15 will abut against the bottom of the notched groove 5b of the one brake shoe 2. However, the lever-ratio of the long link 11 has been set such that h3>h2, hence as shown in FIG. 9, the pre-rotation state as indicated by the double-dash broken line shifts to the post-rotation state as indicated by the solid and broken lines, and the strut 18 is repelled from the bottom of the notched groove 17d of the brake lever 17 by an amount equivalent to the lever-ratio of the long link 11.

As a result, the free end 17b of the brake lever 17 is repelled and extends the distance between the free end 17b and the outlet 20a by an amount just equal to the distance subtracting the distance I3 after rotation from the distance I1 before rotation. Therefore there is no increase in the tension of the remote control device to reduce the brake's effectiveness, thus precluding any need to get flustered and pump the brake pedal or pull harder on the hand brake lever as with conventional devices.

Moreover the remote control cable, not shown in the drawing, normally winds underneath the floor of the vehicle, then the other end is connected to the hand lever inside the passenger compartment. If the free end 17b of the brake lever 17 were to shift as explained, the only change is that the meander portion of the control cable is slightly straightened, with no harmful effect on any structural component. It is obvious that the link lever-ratio can be set to any suitable value, as required.

Should a counterclockwise braking force act on the brake drum causing it to rotate, neither the other brake shoe 3 nor the brake lever 17 move to generate any slackness in the remote control cable.

Example 3

Example 3 is another embodiment of this invention shown in FIGS. 1, 3, 7, 10, and 11, which is equipped with an incremental type of automatic shoe clearance adjustment device which is activated when the service brakes are applied.

A pin 24 affixed on the one end side of the long link 11 freely penetrates through a slot 5d bored in the shoe web 5 of one brake shoe 2 and a hole 25a, provided in the middle of the adjustment lever 25. The adjustment lever 25 is pivotable around the stem component 24a of the pin 24 which protrudes above the hole 5d. One arm 25b of the adjustment lever 25 abuts against the stepped face 15b of the notched groove 15a of the socket 15, while the other arm 25c engages the toothed adjustment wheel 13a of the adjustment bolt 13.

Alternatively, the pin 24 can be affixed to the shoe web 5, and the adjustment level 25 can pivot on the stem component 24a of the pin 24.

Figure 10:
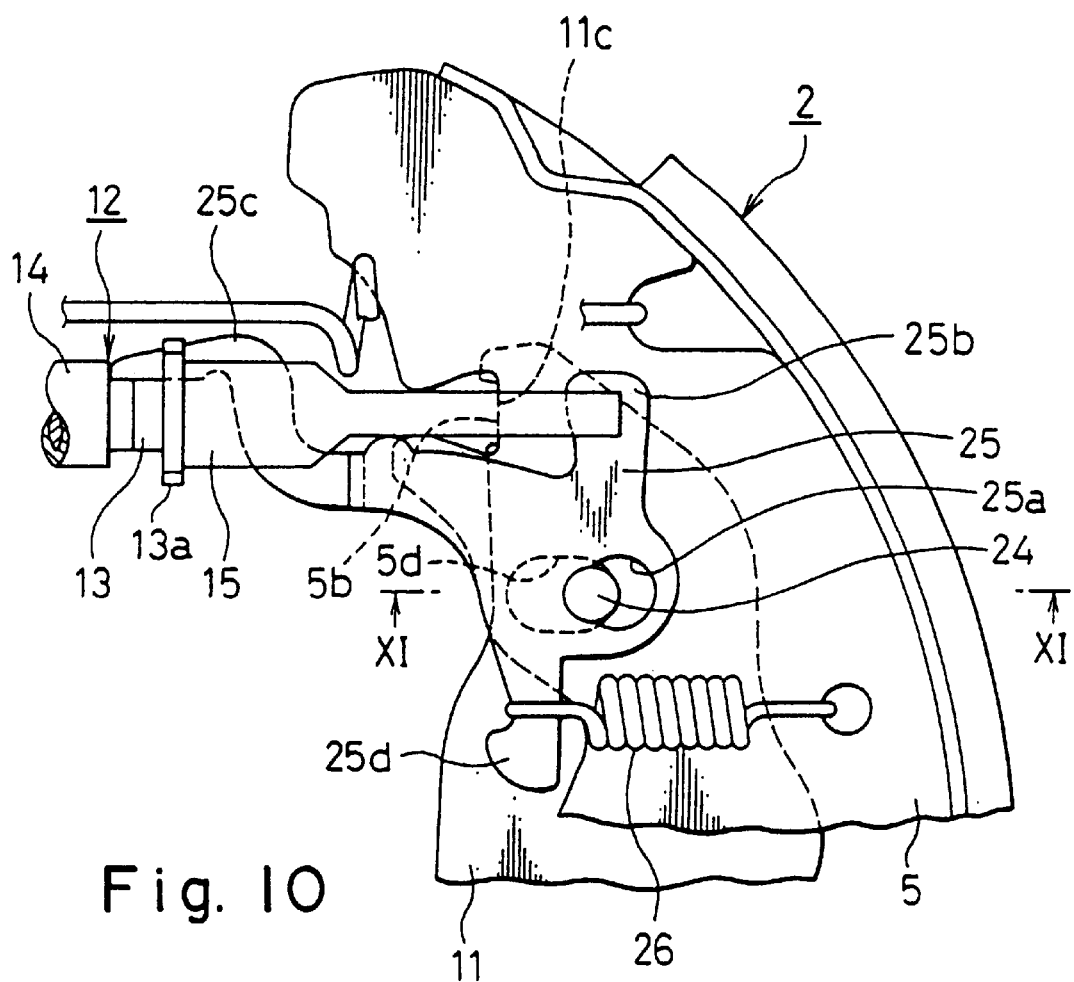
FIG. 10 is a partial enlarged plan view of the drum brake device of this invention as embodied in Example 3.
Figure 11:
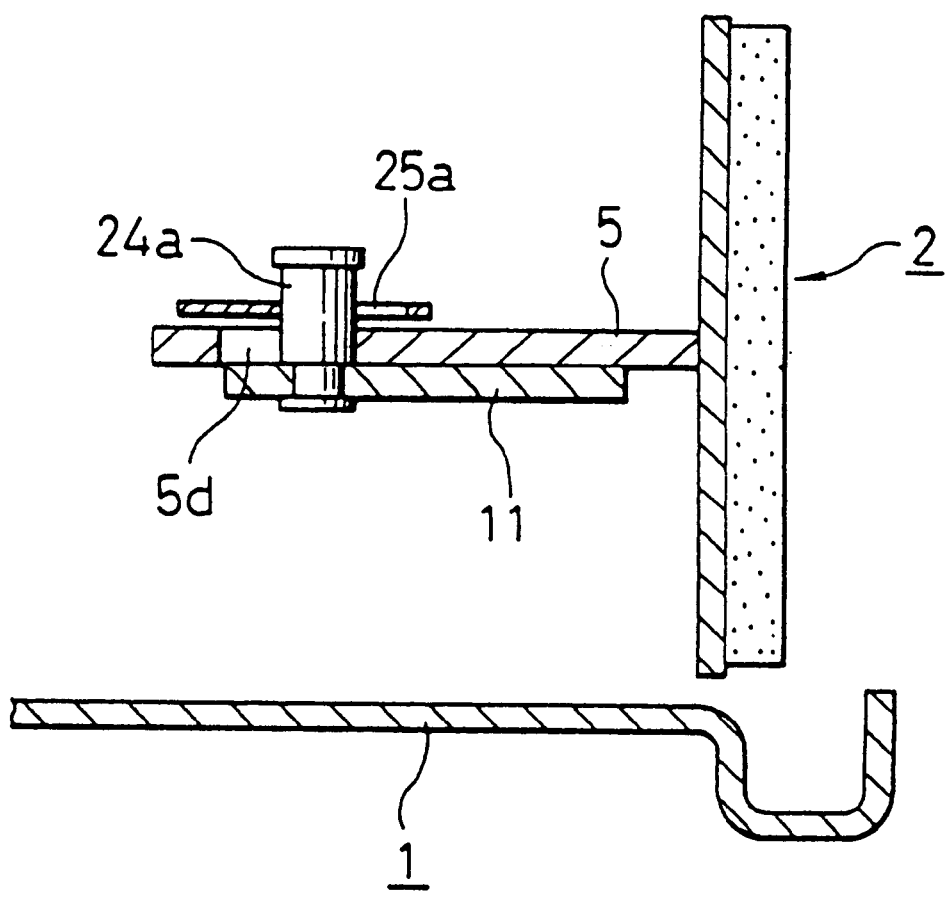
FIG. 11 is a cross section view of FIG. 10 taken along line XI—XI.

An adjustment spring 26 is stretched between another arm 25d of the adjustment lever 25 and the shoe web 5. As shown in FIG. 10, a partial enlarged plan view of FIG. 1, the adjustment spring 26 biases the adjustment lever 25 so as to turn counterclockwise with the pin 24 as the fulcrum. In this state, the perimeter of pin 24 engages with the inner edge of the outer brake side of the slot 5d. Thus, when the long link 11 is temporarily assembled onto the one brake shoe 2, the proper alignment of the notched groove 5b of the one brake shoe 2 and the notched groove 11c can be easily ascertained visually.

The automatic shoe clearance adjustment device can be arranged so as to have left-right symmetry as in FIG. 1. That is, the adjustment lever 25 is arranged to be pivotable on the other brake shoe 3 and the shoe clearance adjustment device 12 is arranged with the left and right sides reversed. A spring mechanism is installed so that the torque that extends the shoe clearance adjustment device 12 will be applied to the adjustment lever 25. In this case, even if the brake lever 17 were set with a touch of pulling it, the engaging position of the adjustment lever 25 and toothed adjustment wheel 13a does not change, and the automatic adjustment action will be more stable.

With the configuration of FIG. 1 and FIG. 10, when the service brake is applied and the two brake shoes 2,3 spread open, the automatic shoe clearance adjustment device 12 trails the other brake shoe 3. On the other hand, the long link 11 trails the one brake shoe 2 in almost tandem at this time. The other arm 25c of the adjustment lever 25 is turned counterclockwise with the pin 24 as the fulcrum as shown in FIG. 10 in an amount equivalent to the sum of the degree of movement of the pin 24 and the amount of movement of the automatic shoe clearance adjustment device.

At this point, if the linings 6, 6 are worm, and the degree of rotation of the other arm 25c of the adjustment lever 25 exceeds the intertooth pitch of the toothed adjustment wheel 13a, the bolt 13 is rotated to be screwed out of the tube segment 14. This automatically adjusts the gap between the brake drum and the linings 6, 6 to maintain a constant clearance.

When the parking brake is applied, the automatic shoe clearance adjustment device 12, the notched groove 11c side of the long link 11, the adjustment lever 25 and other components all trail in tandem the other brake shoe 3 just by the amount it opens. However, with the other brake shoe 2, the pin 24 is freely inlaid to move within its slot 5d; hence it has no effect on the adjustment lever 25. As a result, any automatic adjustment action will not be less than the movement of the adjustment lever 25 when the service brake is applied.

As is evident from this configuration, the biasing force of the adjustment spring 26 constantly acts on the long link 11, even when the service brakes are released; hence, the link 11 will not vibrate.

Example 4

The previous embodiment clearly shows that the required functions can be obtained with a configuration in which the long link 11 spreads open in tandem with the one brake shoe 2. This example will explain a modified version of that embodiment.

These components which differ from the above-mentioned example are marked with an apostrophe. That is, whereas, in the above-mentioned example, the pin 24 fixing on the long link 11 abuts against inner edge of the outer brake side of the slot 5d of the one brake shoe 2, the lower face 11'e of the long link 11' abuts against the anchor block 9. The braking operation and automatic adjustment action of this configuration is the same as for the above-mentioned example, and an explanation is omitted here.

Figure 12:
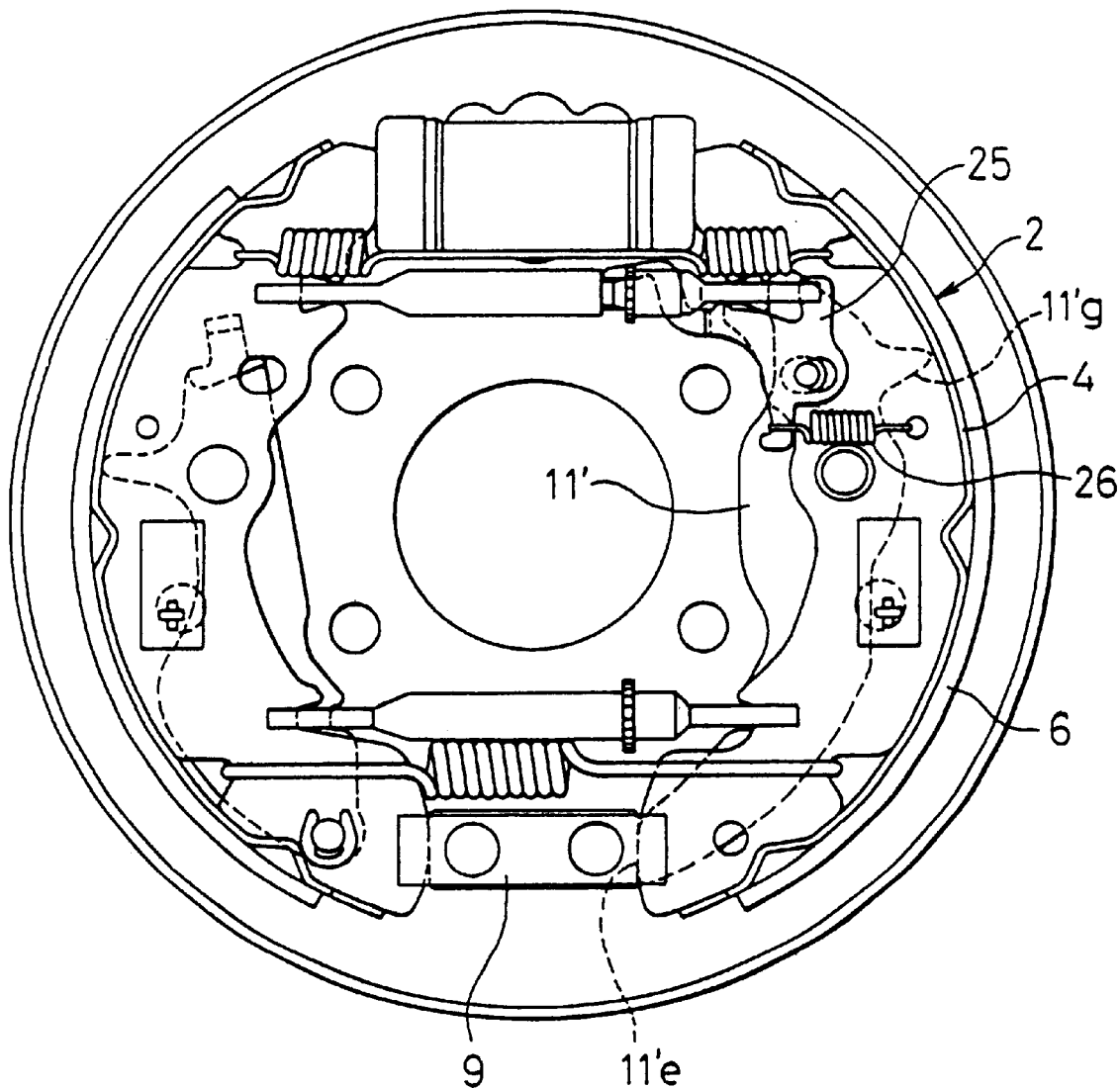
FIG. 12 is a plan view of the drum brake device of this invention as embodied in Example 4.

As shown also in FIG. 12, the same function can be obtained by providing one back edge 11'g of the long link 11' with the inner face of the shoe rim 4'. What is essential is that when the service brake is applied, the long link 11' spreads open in tandem with the one brake shoe 2', and that when the parking brake is applied, the two components turn relative to each other.

With this configuration, even as the lining wears, the long link 11', the adjustment lever 25, and the adjustment spring 26 virtually move in tandem with the one brake shoe 2, thus having no effect on the automatic adjustment action to provide a stable adjustment function for a long period.

Example 5

Figure 13:
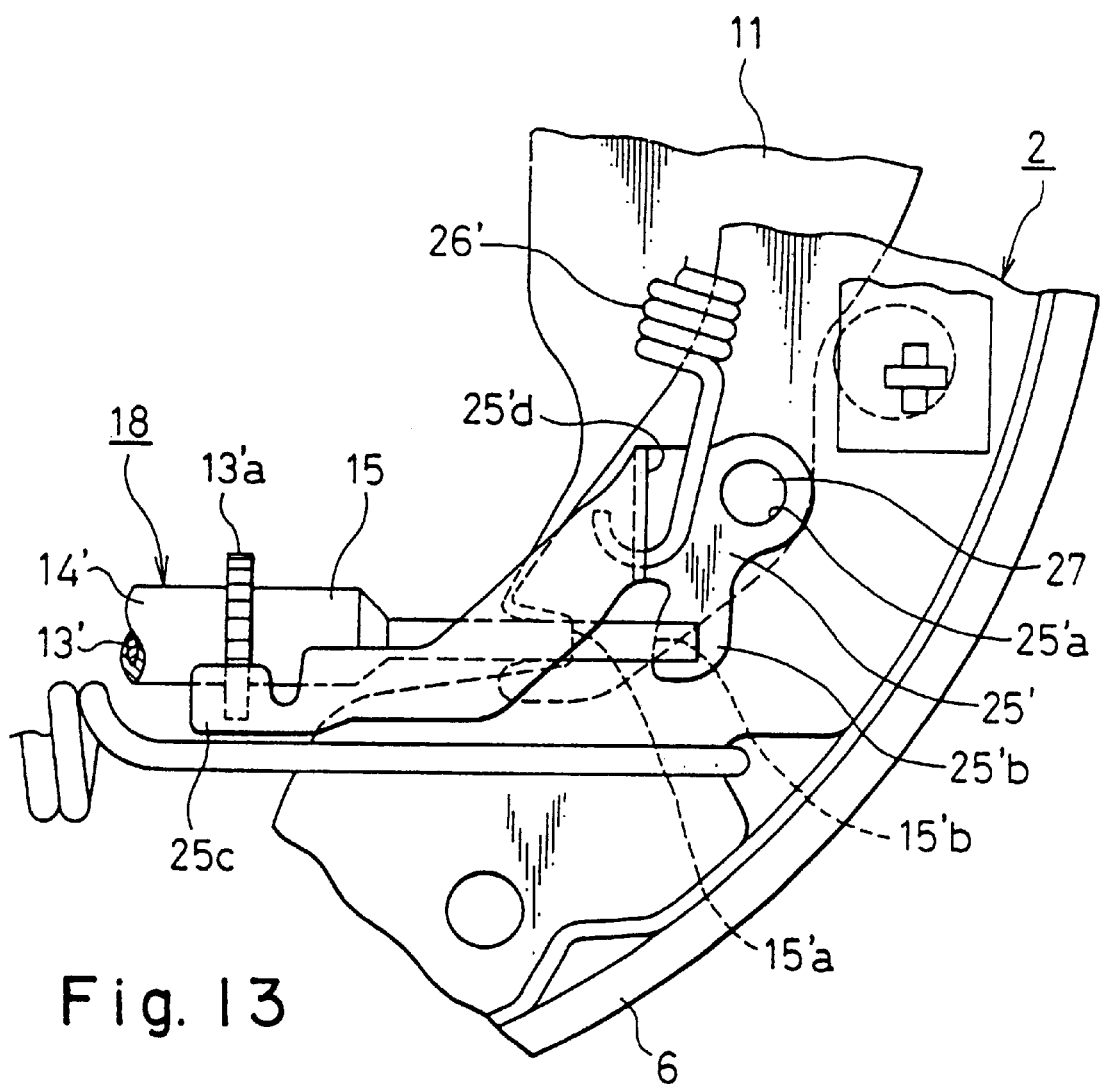
FIG. 13 is a partial enlarged plan view of FIG. 1 for the drum brake device of this invention as embodied in Example 5.

An automatic stroke adjustment device which automatically adjusts the stroke of the brake lever 17 is explained, with reference to FIG. 1, FIG. 4, and FIG. 13, (a partially enlarged plan view of FIG. 1). Those components which have the same function as the previously described shoe clearance adjustment device are marked with an apostrophe.

A pin 27 is mounted on the other side of the shoe web 5 of brake shoe 2, and extends through a hole 25'a bored in the base segment of the adjustment lever 25'. Thus, the adjustment lever 25' is pivotable around the stem segment of the pin 27. One arm 25'b of the adjustment lever 25' abuts against the stepped face 15'b of the notched hole 15'a of the socket 15', while the other arm 25'c engages with the toothed adjustment wheel 13'a.

Alternatively, the pin 27 can be affixed to the long link 11, and the adjustment lever 25' can pivot on the stem segment of the pin 27 that penetrates freely through the shoe web 5.

An adjustment spring 26' is stretched between the vertical member 25'd bent in the middle of the adjustment lever 25' and the hollow portion of the protuberance 11a of the long link 11. The energizing force of the spring acts on the adjustment lever 25' to turn it clockwise, as shown in FIG. 1, with the pin 27 as the fulcrum.

When the service brake is applied and both brake shoes 2, 3 spread open, the strut 18 constantly presses against the brake lever 17 side, while the hole 25'a in base segment of the adjustment lever 25' and the long link 11 trail the one brake shoe 2 in tandem. Hence as shown in FIG. 1 and FIG. 13, the adjustment lever 25' will turn clockwise, with the pin 27 as the fulcrum, by an amount just equal to the movement.

As the linings 6, 6 wear, if the amount of rotation of the other arm 25'c of the adjustment lever 25' exceeds the intertooth pitch of the toothed adjustment wheel 13'a, the bolt 13' is rotated so as to be screwed out of the tube segment 14' to maintain the gap with the long link 11 at a constant value. That is, the stroke of the brake lever 17 is maintained at a constant value, thus imparting a better brake response.

Example 6

Figure 14:
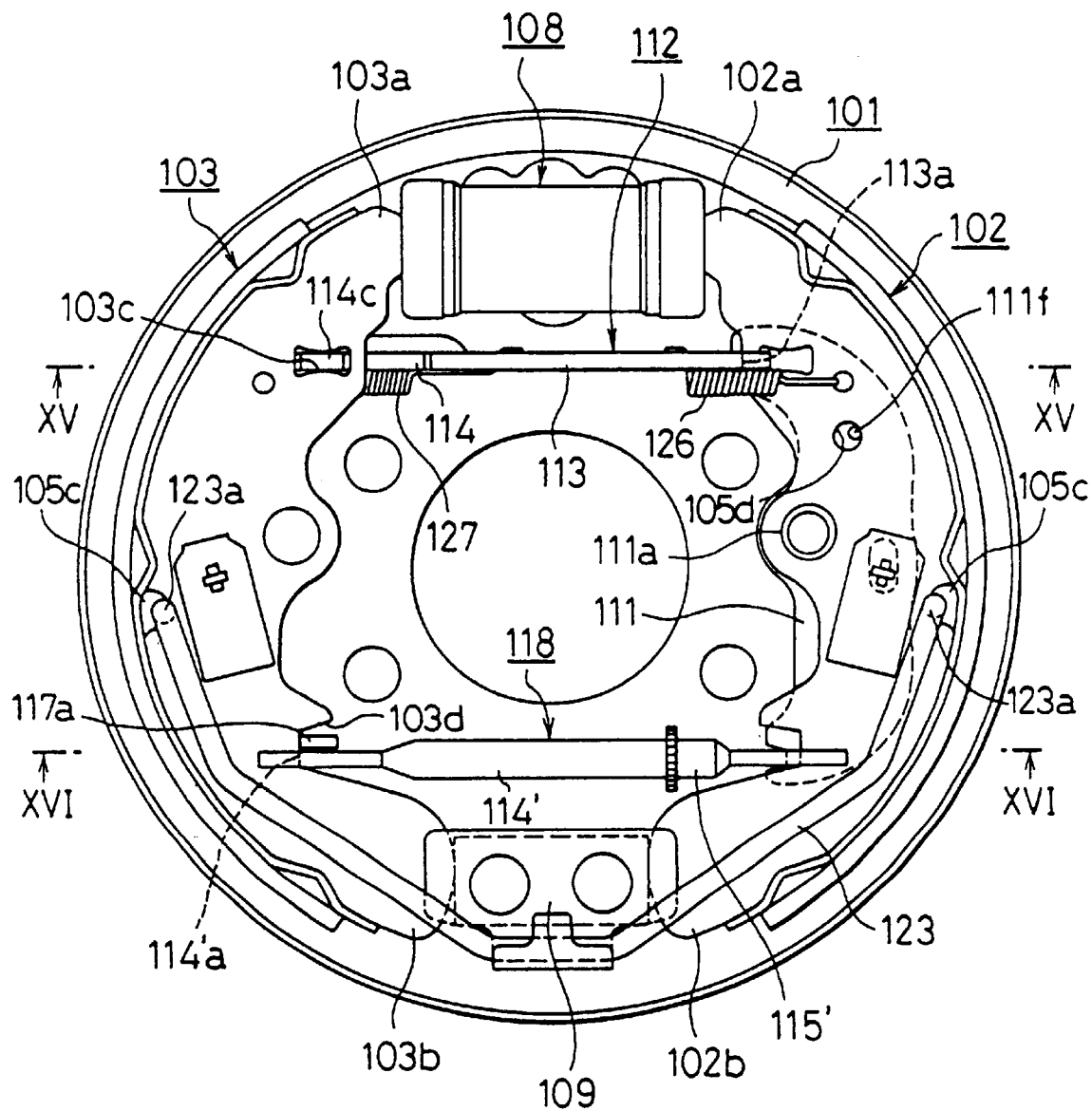
FIG. 14 is a plan view of the drum brake device of this invention as embodied in Example 6.
Figure 15:
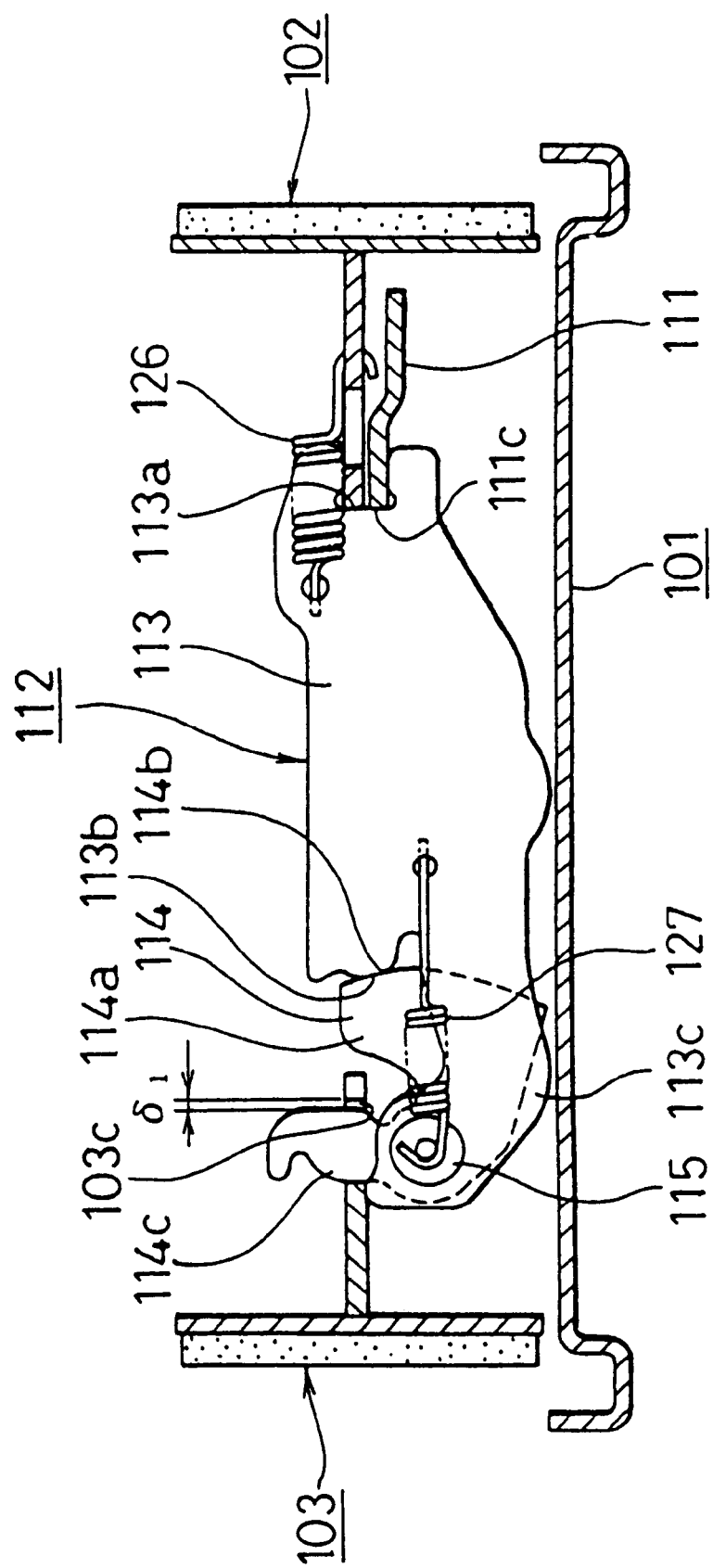
FIG. 15 is a cross section view of FIG. 14 taken along line XV—XV.
Figure 16:
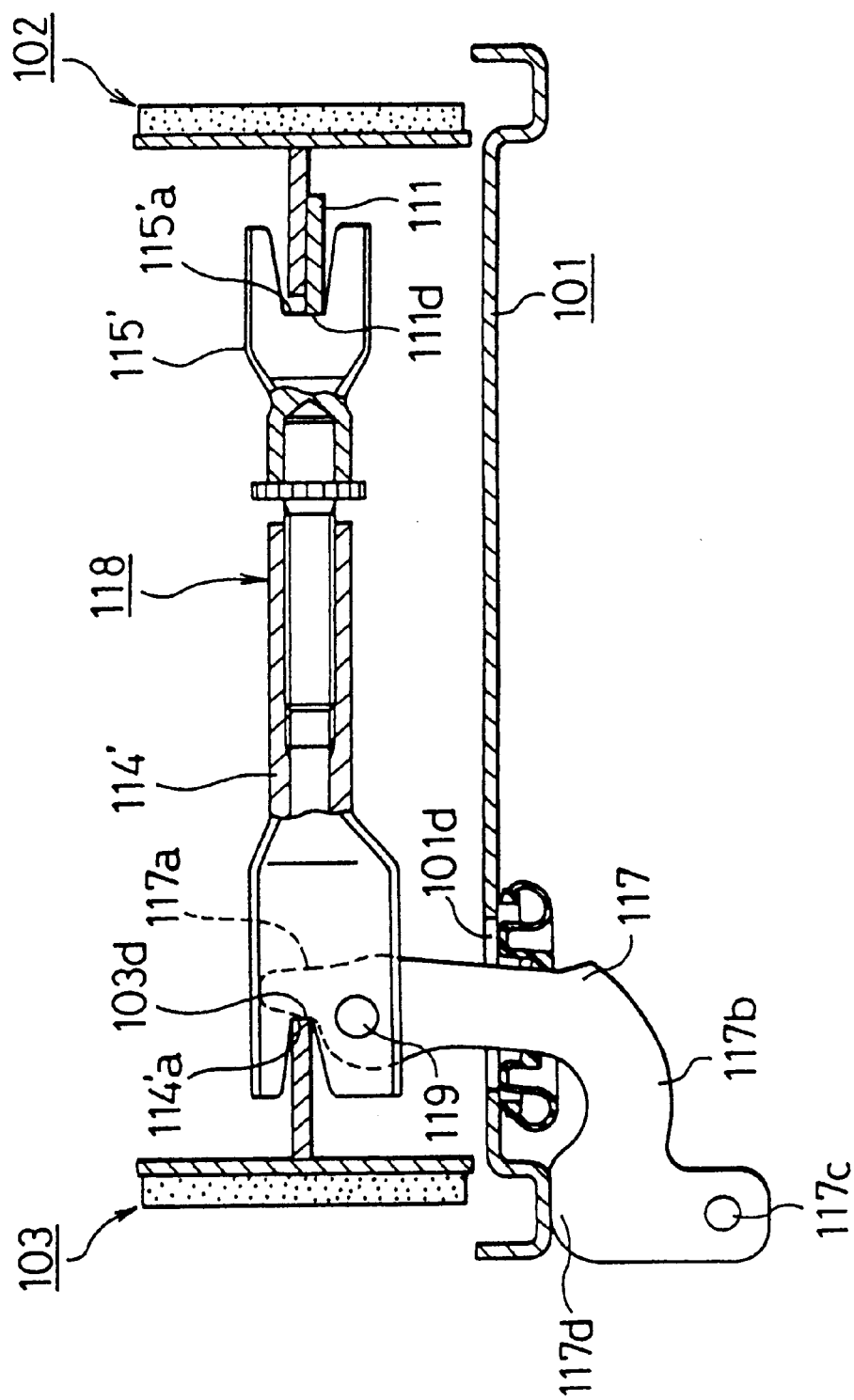
FIG. 16 is a cross section view of FIG. 14 taken along line XVI—XVI.
Figure 17:
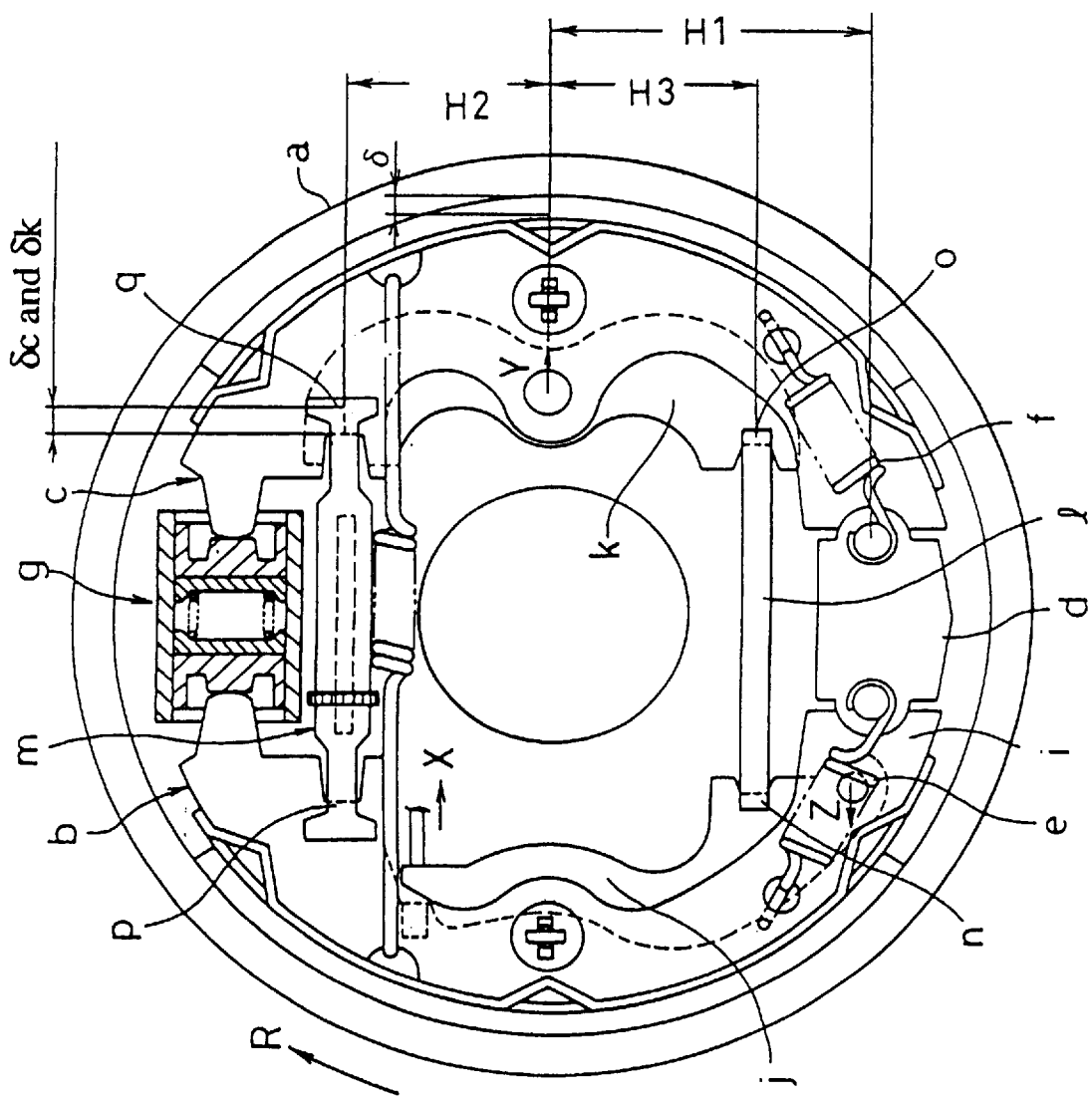
FIG. 17 is a plan view of the conventional drum brake device as disclosed in Australian Patent No. AU-B1-53 491179 on which this invention was based.
Figure 18:
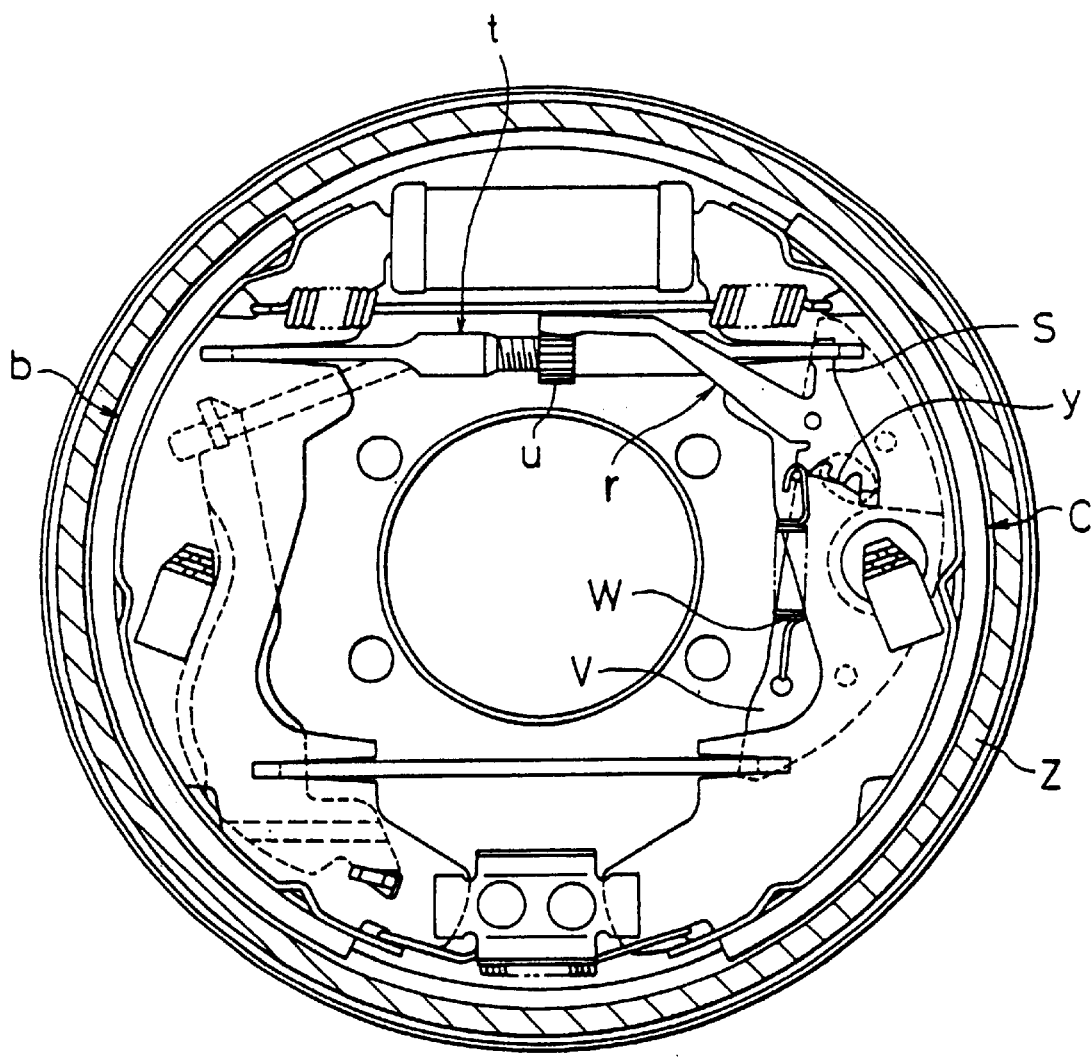
FIG. 18 is a plan view of the conventional drum brake device as disclosed in U.S. Pat. No. 5,275,260 on which this invention was based.
Figure 19:
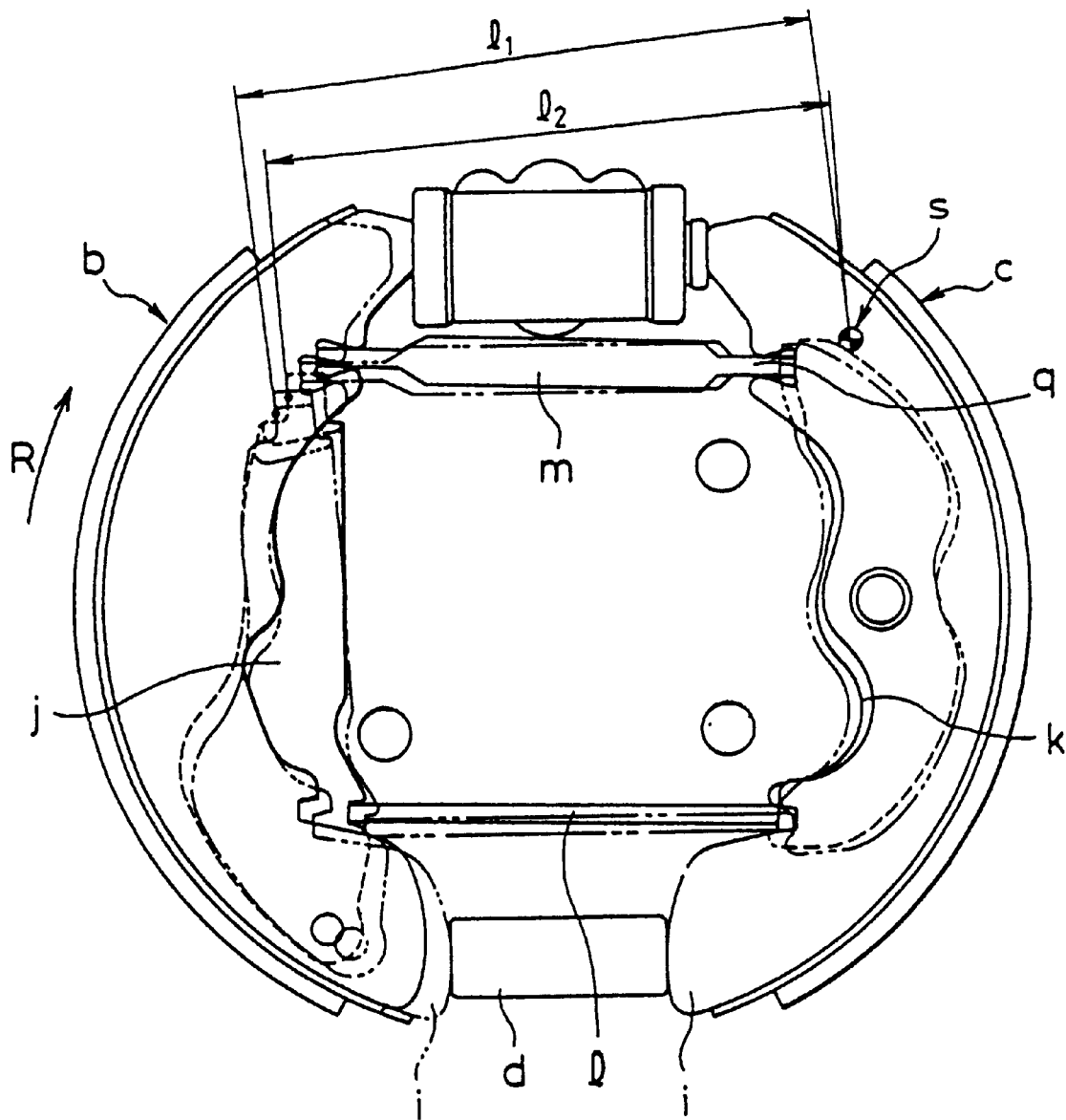
FIG. 19 is a model that explains the operation of the conventional drum brake devices on which this invention was based.

Example 6 is another embodiment shown in FIGS. 14–16 which is equipped with a one-shot type of automatic shoe clearance adjustment device for use when the service brake is applied, and a cross-pull type of parking brake. Those components which are the same as in the above-mentioned example are identified with a 100-series of numbers, for which a detailed explanation is omitted here.

As shown in FIG. 14, these components include a back plate 101, a pair of brake shoes 102, 103 with one pair of adjacent ends 102a, 103a and the other pair of adjacent ends 102b, 103b, an actuator 108 activated when the service brake is applied, an anchor block 109, a long link 111 with a protuberance 111a, a notched groove 111c on one end, a notched groove 111d on the other end and a protuberance 111f. The protuberance 111f abuts against the outer brake side of the large-diameter hole 105d bored in one brake shoe 102.

That is, the two return springs 21, 22 shown in FIG. 1 are replaced with one return spring 123, a fairly thick wire spring configured in the shape of a slightly obtuse U. The middle segment of the wire spring 123 is mounted on top of the anchor block 109, and the two free ends 123a, 123a are bent so as to latch in the holes 105c, 105c bored in the two brake shoes 102, 103.

The wire spring 123 should be stretched in a location such that when the parking brake is applied, the one ends 2a, 3a of the brake shoes 2, 3 will open with the anchor block 109 as the fulcrum.

The configuration of the shoe return spring is not limited to that shown here. A variety of shapes and configurations can be used, such as splitting the second return spring into two segments as configured in some conventional devices.

The automatic shoe clearance adjustment device 112 is configured from a plate adjustment strut 113, a bell crank lever 114, and springs 126, 127. The bottom of the notched groove 113a formed on one end of the adjustment strut 113 abuts against the bottom of the notched groove 111c on one end of the long link 111. Small, short teeth 113b are carved in the middle of the strut 113.

The middle segment of the bell crank lever 114 is supported by the stem of a pin 115 so as to pivot on the other end 113c of the strut 113 and to move lengthwise along the plate face of the strut 113. A fan-shaped arm 114a on one end of the bell crank lever has small, short teeth 114b carved around its perimeter which mesh with the small, short teeth 113b of the strut 113. The other arm 114c with a cam face is positioned with a clearance of δ1 in a rectangular hole 103c formed in brake shoe 103.

An adjustment spring 126 is stretched between the brake shoe 102 and the adjustment strut 113. Another spring 127 is stretched between the adjustment strut 113 and the pin 115. The mounted load of the adjustment spring 126 is set to be greater than that of spring 127.

A cross-pull type of actuator 116, activated when the parking brake is applied, is configured from the brake lever 117, the strut 118, and other components. The finger-shaped segment 117a on one end of the brake lever 117 abuts against the bottom of the notched groove 103d formed on the other end of brake shoe 103. The arm 117b on the other end of the brake lever 117 penetrates freely through the hole 101d in the back plate 101. A mounting hole 117c for connecting the remote control cable (not shown in the drawing) is bored on the reverse L-shaped end of the arm 117b. A protuberance 117d is also formed on the brake lever 117, and abuts against the reverse side of the back plate 101 to regulate the return position of the lever, but is not restricted to this configuration.

The components of the strut 118 are marked with an apostrophe. A notched groove 114'a formed on one end of the tube 114' holds the other end of brake shoe 103. The middle segment of the brake lever 117 is also pivotable by the pin 119 at this end. A notched groove 115'a on the socket 115' holds the other notched groove 111d of the long link 111 and the one brake shoe 102.

The action of this embodiment when the service brake is applied is the same as that of the embodiment of Example 1, and when the parking brake is applied, the only difference is that the brake lever 117 has been changed to a cross-pull type. That is, when the mounting hole 117c of the brake lever 117 is pulled by the remote control cable (not shown in drawing) the brake lever 117 pressed against the strut 118 by the pin 119 with the point of abutment with the brake shoe 103 as the fulcrum. The force of this action is transferred in sequence to the long link 111, automatic shoe clearance adjustment device 112, and finally the rectangular hole 103c of the other brake shoe 103, wherein the one end 103a of brake shoe 103 opens, with the other end 103b as the fulcrum, and engages the brake drum.

Next, the action force is imparted towards the other side of the brake onto the protuberance 111a of the long link 111 with the point of abutment with the adjustment strut 113 as the fulcrum, wherein the one end 102a of brake shoe 102, with the other end 102b as the fulcrum, also opens and engages with the brake drum.

As is clearly evident, the movements of both brake shoes 102, 103, when either the service brake or parking brake is applied, is the same as for the previous embodiments, and the same effectiveness in operation can be obtained.

When the service brake is applied the two brake shoes 102, 103 spread open, the automatic shoe clearance adjustment device 112 receives the action force of the adjustment spring 126 and trails the one brake shoe 102. At this point, if the linings 6,6 are worn, and the amount by which the shoes have opened exceeds the total of the clearance δ1 of the bell crank lever 114 plus the height of the small short teeth 114b, then the bell crank lever 114 turns such that the automatic shoe clearance adjustment device 112 is extended by an amount equivalent to one tooth only to close the gap with the brake drum.

When the parking brake is applied, the only action is that the adjustment strut 113 and the bell crank lever 114 move in tandem with the other brake shoe 103 to the left, and the adjustment spring 126 extends to move the one brake shoe 102 to the right as shown in FIG. 14. Thus, there is no effect on the automatic adjustment action.

This invention is not, by any means, limited to the aforementioned embodiments. For example, an incremental type of automatic shoe clearance adjustment device can be combined with a cross-pull type of parking brake; or a one-shot type of automatic shoe clearance adjustment device can be combined with a forward-pull type of parking brake. Other examples include superimposing the long link 11, 11', 111 on that face of the shoe web 5 on the side which the brake drum is mounted. A stroke adjustment device can be fitted to the automatic shoe clearance adjustment device used in the conventional device of U.S. Pat. No. 5,275,260 to provide a stable automatic adjustment action for a prolonged period. The possibility of many other variations should be evident to those people technically skilled in this industry.

As is evident from the aforementioned configurations, this invention provides the following advantages.

A clearance adjustment device in which, its whole length of a strut suspended between the brake lever and the long link, can be adjusted, has been set on top of a strut. This ensures a constant stroke of the brake lever, and no slackness in the hand brake, throughout the life of the brake shoe linings.

The relative positions of the one brake shoe and the long link engaging with the shoe clearance adjustment device are constant along the lengthwise direction of the shoe clearance adjustment device. Hence when the parking brake is applied, even if a braking force is applied to the brake drum causes it to rotate, the piston of the service brake actuator is returned to a minimal degree. This provides a good service brake response when the service brake is applied after the parking and service brake is applied simultaneously.

The lever-ratio of the long link can be changed so that the free end of the brake lever is not displaced in the direction to provide a slack to the remote control cable. Thus there is no reduction in braking effectiveness when the vehicle has stopped on a slope and the service brake is released after the hand lever has been locked. This frees the driver from any concerns about rolling upon starting the car in motion again. The driver need not step on the foot brake again or pull on the hand lever again.

The brake shoes do not separate from the anchor block, even when the parking brake is applied, in which case no noise is generated even when a torque is generated on the brake drum starts, thus eliminating any discomfort or anxiety for the driver.

No impact load is applied to the anchor block, hence the strength of its periphery can be reduced to make the device lighter.

The end of the brake shoe on the anchor block side can be prevented from opening solely and easily by a proper setting of the mounting loads of the shoe return springs and their positions.

No impact load is applied to any other component as well, which assures long-term reliability in terms of strength, durability, and other properties.

The adjacent ends 2b, 3b, will not be separated from the anchor block 9 even in the situation that the brake lever 17 is not set in its return position precisely, thereby avoiding the unusual dragging between the lining and the drum brake or the wheel being locked when the brake shoe bites the brake drum.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What we claim is:

1. A drum brake device comprising:

a back plate, two brake shoes provided to face each other on top of said back plate, a service brake actuator on said back plate between one pair of first adjacent ends of said brake shoes, an anchor block on said back plate between the other pair of second adjacent ends of the brake shoes, a shoe clearance adjustment device adjacent to said service brake actuator between said two brake shoes, a parking brake actuator adjacent to said anchor, a long link having a middle segment pivotably mounted at a pivot point on a middle portion of one brake shoe, one end of said link and the other end of said link respectively functionally engaged to said shoe clearance adjustment device and said parking brake actuator, wherein a first distance defined between a horizontal base line, parallel to a horizontal center line, extending centrally through the pivot point located in a central region of the long link and a first horizontal line extending along with and through the parking brake actuator is longer than a second distance defined between the base line and a second horizontal line extending along with and though the shoe clearance adjustment device.

2. A drum brake device as claimed in claim 1, wherein the long link operates in tandem with said one brake shoe when the service brake is applied.

3. A drum brake device as claimed in claim 1, in which said shoe clearance adjustment device senses an amount by which said pair of brake shoes has opened and automatically adjusts the clearance between the brake shoes and the brake drum.

4. A drum brake device as claimed in claim 1, wherein with the pivot point in the central region of said long link as the fulcrum, the resistance to spread open said pair of the brake shoes on said other side is greater than the resistance to spread open said pair of the brake shoes on said one side.

5. A drum brake device as claimed in claim 4, wherein the moment applied to the second adjacent ends of the brake shoes, which is a combination of the force of the second shoe return spring and the distance for said pivotal mount of said brake shoe with said link to said shoe return spring, is greater than the moment applied to the first adjacent ends of the brake shoes, which is a combination of the force of the first shoe return spring and the distance from said pivotal mount to said shoe return spring.

6. A drum brake device as claimed in claim 4, further comprising a first shoe return spring between one side of said two brake shoes and a second shoe return spring stretched between said other side of said two brake shoes, wherein with the pivot point in the middle of said long link as the fulcrum, the torque of the second shoe return spring is greater than the torque of the first shoe return spring.

7. A drum brake device as claimed in claim 1, in which a protuberance integrally formed by a press onto the middle segment of said long link is pivotable in a hole bored in said brake shoe.

8. A drum brake device as claimed in claim 1 in which a protuberance integrally formed by a press onto the middle segment of one brake shoe is pivotable in a hole bored in said long link.

9. A drum brake device comprising:

a back plate;

two brake shoes facing each other on top of said back plate;

a service brake actuator mounted on said back plate and positioned between one pair of adjacent ends of said brake shoes;

an anchor block mounted on each back plate and positioned between the other pair of adjacent ends of the brake shoes;

a shoe clearance adjustment device adjacent to said service brake actuator between said two brake shoes;

a parking brake actuator adjacent to said anchor, and a long link pivotable at a middle segment thereof at a pivot point to a middle of one brake shoe, said shoe clearance adjustment device and said parking brake actuator being functionally engaged on one end and the other end respectively of said link;

wherein a distance from the pivot point in the middle of the long link to the parking brake actuator is longer than a distance from said pivot point to the shoe clearance adjustment device.

* * * * *